United States Patent
Sano et al.

(10) Patent No.: US 6,741,416 B2
(45) Date of Patent: May 25, 2004

(54) TRACKING SIGNAL GENERATING DEVICE AND METHOD, AND MAGNETIC RECORDING/REPRODUCING SYSTEM

(75) Inventors: Kousei Sano, Osaka (JP); Shin-ichi Kadowaki, Hyogo (JP); Hajime Hatada, Ehime (JP); Ikuo Ohmura, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 344 days.

(21) Appl. No.: 09/736,798

(22) Filed: Dec. 14, 2000

(65) Prior Publication Data

US 2001/0004304 A1 Jun. 21, 2001

(30) Foreign Application Priority Data

Dec. 16, 1999 (JP) .............................. 11-357920

(51) Int. Cl.⁷ .............................................. G11B 5/596
(52) U.S. Cl. ..................................... 360/77.03; 369/13
(58) Field of Search ..................... 360/77.03, 78.11; 369/43, 13, 44.11, 44.26, 44.29, 44.13, 44.34, 44.35, 44.36, 44.37, 44.41

(56) References Cited

U.S. PATENT DOCUMENTS

| | | | |
|---|---|---|---|
| 4,085,423 A | * 4/1978 | Tsunoda et al. | 369/44.37 |
| 4,633,451 A | * 12/1986 | Ahn et al. | 369/14 |
| 4,673,810 A | * 6/1987 | Babsch et al. | 250/231.1 |
| 4,747,089 A | * 5/1988 | Eguchi et al. | 369/44.34 |
| 4,764,914 A | * 8/1988 | Estes et al. | 369/53.14 |
| 4,817,073 A | * 3/1989 | Suzuki | 369/44.28 |
| 5,123,002 A | * 6/1992 | Tateishi | 369/44.32 |
| 5,132,948 A | * 7/1992 | Ishibashi | 369/44.34 |
| 5,148,424 A | * 9/1992 | Wachi | 369/44.37 |
| 5,191,571 A | * 3/1993 | Fukumoto et al. | 369/44.37 |
| 5,235,584 A | * 8/1993 | Yoshio et al. | 369/44.29 |
| 5,325,244 A | * 6/1994 | Takano et al. | 360/77.03 |
| 5,587,985 A | * 12/1996 | Sano et al. | 369/124.02 |
| 5,952,074 A | * 9/1999 | Umebayashi et al. | 428/65.3 |
| 6,327,110 B1 | * 12/2001 | Sano et al. | 360/77.03 |
| 6,407,968 B1 | * 6/2002 | Nakata et al. | 369/44.26 |

FOREIGN PATENT DOCUMENTS

JP  53-110504  9/1978

* cited by examiner

Primary Examiner—David Hudspeth
Assistant Examiner—K. Wong
(74) Attorney, Agent, or Firm—Merchant & Gould P.C.

(57) ABSTRACT

A device and a method are provided in which stable tracking control can be carried out even in an arbitrary phase by optically reading pits provided in a disk when information is recorded on and reproduced from the disk with a magnetic head. With respect to difference signals obtained from a main beam signal and sub-beam signals obtained through three-beam type photodetectors, gain correction is executed in variable gain amplifiers, respectively, so that output signals therefrom have same amplitude levels and are different in phase by 90 degrees in a track crossing direction, and thus a tracking error signal is generated by being synthesized from the output signals. Based on the tracking error signal, tracking control is carried out.

8 Claims, 17 Drawing Sheets

TRACKING SIGNAL GENERATING DEVICE AND METHOD, AND MAGNETIC RECORDING/REPRODUCING SYSTEM

BACKGROUND OF THE INVENTION

1. Field of the Invention

The present invention relates generally to a tracking signal generating device for obtaining a tracking error signal for positioning an optical head or a magnetic head in recording and/or reproducing information with respect to an information recording medium such as a high-density floppy disk, optical disk, or the like and to a magnetic recording/reproducing system carrying out tracking control using the tracking signal generating device.

2. Related Background Art

The intervals between tracks where a series of information is recorded are reduced with the increase in recording density with which information is recorded on a magnetic disk such as a floppy disk. This makes it difficult to position a magnetic head or the like in a direction perpendicular to the tracks with a mechanical precision. Consequently, an optical positioning technique has been required.

For instance, in a high-density floppy disk, tracks formed of tracking pit rows are arranged at an interval of about 20 $\mu$m so that a magnetic head can track information tracks arranged at an interval of about 10 $\mu$m. In this case, using an optical system with an numerical aperture NA of about 0.04 on a disk side with a wavelength of a light source of 780 nm, a tracking error signal can be obtained. The tracks to be tracked are formed of pit rows whose lengths are 40 to 70 $\mu$m. The lengths of the pit rows are determined depending on the radial position so that signals from the tracks obtained at a revolution rate of 720 per minute have a frequency of 20 kHz. A conventional example used for obtaining a tracking signal from such a disk is described with reference to FIG. 15 as follows.

Light emitted from a semiconductor laser 101 as a light source is incident on a diffraction grating 162 provided at a first plane of a diffraction element 160 to generate ±1st-order diffracted lights (not shown in the figure). In this case, zero-order light is referred to as a main beam (M) and ±1st-order diffracted lights as sub-beams (S1 and S2).

The main beam and the sub-beams pass through a diffraction grating 161 provided at a second plane of the diffraction element 160 and are converged by a lens 104 as a converging means. The main beam and the sub-beams that have become converged lights are focused on a disk 107 as an information recording medium with an aperture being limited so that a desirable numerical aperture (NA) is obtained through an aperture 105.

With reference to FIG. 16, the relationship between the beams and a pit row on the disk is described. There are tracks 204 formed of rows of pits 205 on the disk 107. On the disk 107, a beam row formed of a main beam (M) 201 and two sub-beams (S1 and S2) 202 and 203 is positioned so as to have a predetermined angle θ0 with respect to a track 204 of the disk 107.

In the figure, l denotes an interval between M and S1 or S2 on the disk 107, Tp indicates an interval between two adjacent tracks 204, and Tpp denotes a radial distance from M to S1 or S2. A tangential direction is a circumferential direction in the disk 107 and a radial direction is a direction of the radius of disk 107.

Returning to FIG. 15, the main beam and the sub-beams reflected from the disk 107 pass through the aperture 105 and the lens 104 again and are diffracted by the diffraction grating 161, and then enter a photodetector 108R or 108L.

The photodetectors 108R and 108L include a plurality of detection regions to receive the main beam and the sub-beams separately, and output signals corresponding to the quantity of received beams. The three beams irradiate locations different in a direction perpendicular to the tracks on the disk 107. Therefore, signals obtained from the three detection regions are different in modulation degree from one another. Through calculation of these signals by a tracking error signal generating device shown in FIG. 17, the relative positional relationship between the track and the beam irradiation locations can be detected.

Next, the following description is directed to the tracking error signal generating device shown in FIG. 17. One sub-beam S1 of the two sub-beams is received by a detection region 301 of the photodetector 108L and a detection region 304 of the photodetector 108R and the respective photodetectors 108L and 108R output currents corresponding to the quantity of the received beams. The currents are converted to a voltage signal by an I–V amplifier 401, which then is output. Similarly, the main beam M is received by a detection region 302 of the photodetector 108L and a detection region 305 of the photodetector 108R, and current signals corresponding to the quantity of the received beams are converted to a voltage signal by an I–V amplifier 402, which then is output. Furthermore, another sub-beam S2 also is received by a detection region 303 of the photodetector 108L and a detection region 306 of the photodetector 108R, and current signals corresponding to the quantity of the received beams are converted to a voltage signal by an I–V amplifier 403, which then is output.

In this case, generally, the three beams M, S1, and S2 generated by the diffraction grating 161 are affected by diffraction efficiency and their quantities received by the photodetectors 108L and 108R are different from one another. Therefore, the I–V amplifiers 401, 402, and 403 have a gain ratio canceling the influence of the diffraction efficiency.

Next, the signals output from the I–V amplifiers 401, 402, and 403 are input into bandpass filters 404, 405, and 406, respectively, and are subjected to bandpass with signals of 20 kHz as a frequency used for the reproduction of a pit row being centered. The signals output from the bandpass filters 404, 405, and 406 are input into detection circuits 407, 408, and 409, respectively. From the signals of 20 kHz, their envelope signals are extracted. The amplitudes of the envelope signals reflect the positional relationships between the track and the beams on the disk 107 and vary accordingly.

The signal output from the detection circuit 407 is indicated as Ss1, the signal output from the detection circuit 408 as Sm, and the signal output from the detection circuit 409 as Ss2.

Further, an amplitude level of the signal Sm (½ of the difference between a maximum value and a minimum value of the signal Sm when an optical beam moves for a distance equal to or more than the interval Tp in the radial direction on the disk 107) is indicated as Lm, amplitude levels of the signals Ss1 and Ss2 as L1 and L2, respectively, a phase of the signal Ss1 with respect to the signal Sm as φ1, and a phase of the signal Ss2 with respect to the signal Sm as φ2. In this case, the signals Sm, Ss1, Ss2 and the phases φ1 and φ2 are expressed by $$Sm = Lm \times \sin\theta, \qquad \text{Eq. 1}$$

$$Ss1 = L1 \times \sin(\theta - \phi1), \qquad \text{Eq. 2}$$

$$Ss2 = L2 \times \sin(\theta + \phi2), \text{ and} \qquad \text{Eq. 3}$$

$$\phi1 = \phi2 = 2\pi \times Tpp/Tp, \qquad \text{Eq. 4}$$

wherein θ can be obtained by θ=2π×Lj/Tp, where Lj denotes a radial distance between the track 204 and the main beam M.

Next, a differential operational circuit 410 receives the signals Ss1 and Sm and outputs a difference signal Sa thereof. In addition, a differential operational circuit 411 receives the signals Sm and Ss2 and outputs a difference signal Sb thereof. These difference signals Sa and Sb are expressed by $$Sa = Sm - Ss1 = La \times \sin(\theta + \phi a) \text{ and} \qquad \text{Eq. 5}$$

$$Sb = Ss2 - Sm = Lb \times \sin(\theta + \phi b), \qquad \text{Eq. 6}$$

wherein the amplitude levels La and Lb of the signals Sa and Sb and the phase differences φa and φb are expressed by $$\tan \phi a = \frac{-L1 * \sin \phi 1}{-Lm + L1 * \cos \phi 1} \qquad \text{Eq. 7}$$

$$La = \sqrt{Lm^2 + L1^2 + 2*Lm*L1*\cos \phi 1} \qquad \text{Eq. 8}$$

$$\tan \phi b = \frac{-L2 * \sin \phi 2}{Lm - L2 * \cos \phi 2} \qquad \text{Eq. 9}$$

$$Lb = \sqrt{Lm^2 + L2^2 + 2*Lm*L2*\cos \phi 2} \qquad \text{Eq. 10}$$

Then, a signal synthesizing circuit 412 receives the difference signals Sa and Sb and synthesizes a tracking error signal TE. This signal TE is expressed by $$TE = \alpha j \times Sa + \beta j \times Sb, \qquad \text{Eq. 11}$$

wherein αj and βj are given by $$\alpha j = \cos \phi j \text{ and} \qquad \text{Eq. 12}$$

$$\beta j = \sin \phi j, \qquad \text{Eq. 13}$$

where φj is defined as $$\phi j = -\pi/4 + 2\pi \times c/Tp. \qquad \text{Eq. 14}$$

When a distance between a magnetic head 170 and the main beam M on the disk 107 is indicated as Lo-m, Lo-m is expressed by $$Lo\text{-}m = n \times Tp + c, \qquad \text{Eq. 15}$$

wherein n denotes an integer, 0<c<Tp holds, and the values of αj and βj are determined by a control circuit 413 so that the tracking error signal TE crosses zero when the magnetic head is positioned on a track.

Practically, the device seeks to position the magnetic head 170 (FIG. 15) in the vicinity of a magnetic track on which predetermined magnetic data have been recorded, and the value of φj (i.e. the values of αj and βj) is determined through learning so that a maximum amplitude of signals can be obtained or a minimum error ratio can be achieved.

The following description is directed to the reason why the value of φj must be determined through learning. In a magnetic recording/reproducing system for recording or reproducing information using the magnetic head 170 and detecting the tracking error signal TE using the optical system, the distance Lo-m between the magnetic head and the main beam on the disk 107 must be at least several hundreds of micrometers to several millimeters. In other words, a point P1 where the magnetic head 170 contacts with the disk 107 and a focal point P2 of the main beam M scan different tracks on the disk 107.

In the assembly of the magnetic recording/reproducing system, when the point P1 is positioned exactly on a track of the disk 107, the distance Lo-m is adjusted so that the operating point of the tracking control is positioned in the midpoint of the amplitude of the tracking error signal TE. However, the disk 107 expands and contracts when the temperature or humidity varies and the track pitch Tp varies accordingly. In addition, disks used as the disk 107 may have variations in track pitch Tp, respectively. Therefore, the point P1 deviates from the track to be tracked and the information reproduction characteristic of the magnetic head 170 deteriorates considerably unless the value of φj (i.e. the values of αj and βj) is determined to correct the tracking error signal TE. In order to avoid such deterioration, the value of φj is determined through learning.

Values in a table recorded in a memory or the like are used as the values of αj and βj. Based on the tracking error signal TE thus obtained, the tracking control is carried out and the magnetic head 170 tracks an information track to write or readout information.

In a conventional operational circuit or method for obtaining the tracking error signal TE, when the positional relationship between a beam row formed of the main beam M and the two sub-beams S1 and S2 and a track formed of a pit row on the disk deviates from an ideal state, the amplitude level of the tracking error signal TE varies depending on the phase of the tracking error signal to be synthesized. In order to carry out stable tracking control, it is required that the amplitude level of the tracking error signal TE does not vary even when the tracking error signal TE is obtained in an arbitrary phase.

SUMMARY OF THE INVENTION

Therefore, the present invention is intended to solve the aforementioned problem, and it is an object of the present invention to provide a tracking signal generating device and method and a magnetic recording/reproducing system, which enable stable tracking control even in an arbitrary phase.

In order to achieve the above-mentioned object, a first tracking signal generating device according to the present invention includes a light source for emitting light, an optical system, photodetectors, position signal generating sections, intermediate signal generating sections, and a signal synthesizing circuit. With the optical system, an information recording medium with a track from which information can be readout optically is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The intermediate signal generating sections receive the three position signals Sm, Ss1, and Ss2, calculate differences between Sm and Ss1 and between Sm and Ss2 with the position signal Sm being taken as a reference, execute calculation for correction, and generate two intermediate signals Sa and Sb. The signal synthesizing circuit synthesizes a zero-crossing tracking signal in an arbitrary phase with respect to the track from the intermediate signals Sa and Sb. The intermediate signal generating sections execute the correction so that the intermediate signals Sa and Sb have same amplitude levels and are different in phase by $\pi/2$ rad in a track crossing direction, and output them.

In the tracking signal generating device, preferably the signal synthesizing circuit multiplies the two intermediate signals Sa and Sb input thereinto by coefficients $\alpha$ and $\beta$ given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and $\phi$ are constants, and adds them.

In order to achieve the above-mentioned object, a second tracking signal generating device according to the present invention includes a light source for emitting light, an optical system, photodetectors, position signal generating sections, a first variable gain amplifier, a second variable gain amplifier, a third variable gain amplifier, a fourth variable gain amplifier, a first differential operational circuit, a second differential operational circuit, and a signal synthesizing circuit. With the optical system, an information recording medium with a track from which information can be readout optically is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The first variable gain amplifier has a coefficient Fm1, receives the position signal Sm, and outputs a signal Fm1·Sm. The second variable gain amplifier has a coefficient Fm2, receives the position signal Sm, and outputs a signal Fm2·Sm. The third variable gain amplifier has a coefficient F1, receives the position signal Ss1, and outputs a signal F1·Ss1. The fourth variable gain amplifier has a coefficient F2, receives the position signal Ss2, and outputs a signal F2·Ss2. The first differential operational circuit receives the signals Fm1·Sm and F1·Ss1 output from the first and third variable gain amplifiers and obtains a difference signal Sa3 of the signals Fm1·Sm and F1·Ss1. The second differential operational circuit receives the signals Fm2·Sm and F2·Ss2 output from the second and fourth variable gain amplifiers and obtains a difference signal Sb3 of the signals Fm2·Sm and F2·Ss2. The signal synthesizing circuit multiplies the difference signals Sa3 and Sb3 from the first and second differential operational circuits by predetermined coefficients and adds them, which is output as a tracking signal. The coefficients Fm1, Fm2, F1, and F2 are determined with respect to the first to fourth variable gain amplifiers so that the difference signals Sa3 and Sb3 have the same amplitude level and are different in phase by $\pi/2$ rad in a track crossing direction.

In the second tracking signal generating device, preferably the respective coefficients Fm1, Fm2, F1, and F2 of the first to fourth variable gain amplifiers satisfy $$Fm1/F1 = L1 \times (\cos \phi 1 + \sin \phi 1)/Lm,$$

$$Fm2/F2 = L2 \times (\cos \phi 2 + \sin \phi 2)/Lm, \text{ and}$$

$$F1/F2 = L2 \times |\sin \phi 2|/(L1 \times |\sin \phi 1|),$$

wherein $\phi 1$ denotes a phase difference between the position signals Sm and Ss1, $\phi 2$ a phase difference between the position signals Sm and Ss2, Lm an amplitude of the position signal Sm, L1 an amplitude of the position signal Ss1, and L2 an amplitude of the position signal Ss2.

In the second tracking signal generating device, preferably the signal synthesizing circuit multiplies the two difference signals Sa3 and Sb3 input thereinto by coefficients $\alpha$ and $\beta$ given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and $\phi$ are constants, and adds them.

In order to achieve the above-mentioned object, a third tracking signal generating device according to the present invention includes a light source for emitting light, an optical system, photodetectors, position signal generating sections, a first differential operational circuit, a second differential operational circuit, and a signal synthesizing circuit. With the optical system, an information recording medium with a track from which information can be readout optically is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The first differential operational circuit receives the position signals Sm and Ss1 and outputs a difference signal Sa thereof. The second differential operational circuit receives the position signals Sm and Ss2 and outputs a difference signal Sb thereof. The signal synthesizing circuit multiplies the difference signals Sa and Sb output from the first and second differential operational circuits, respectively, by predetermined coefficients $\alpha$ and $\beta$ and adds them, which is output as a tracking signal. The coefficients $\alpha$ and $\beta$ are given by $$\alpha = (C \cdot \cos \phi)/La \text{ and}$$

$$\beta = (C \cdot \sin \phi)/Lb$$

or $$\alpha = (C \cdot \sin \phi)/La \text{ and}$$

$$\beta = (C \cdot \cos \phi)/Lb,$$

wherein La and Lb denote amplitudes of the difference signals Sa and Sb, respectively, and C and $\phi$ are constants.

In order to achieve the above-mentioned object, a fourth tracking signal generating device according to the present invention includes a light source for emitting light, an optical system, photodetectors, position signal generating sections, a first differential operational circuit, a second differential operational circuit, a signal synthesizing circuit, and a variable gain amplifier. With the optical system, an information recording medium with a track from which information can be readout optically is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The first differential operational circuit receives the position signals Sm and Ss1 and outputs a difference signal Sa thereof. The second differential operational circuit receives the position signals Sm and Ss2 and outputs a difference signal Sb thereof. The signal synthesizing circuit multiplies the difference signals Sa and Sb output from the first and second differential operational circuits, respectively, by predetermined coefficients and adds them. The variable gain amplifier receives a signal output from the signal synthesizing circuit and multiplies it by a suitable coefficient, which is output as a tracking signal. In the variable gain amplifier, the suitable coefficient is determined so that the signal input into the variable gain amplifier has a predetermined amplitude level during track crossing.

In order to achieve the above-mentioned object, a first tracking signal generating method according to the present invention is carried out by irradiating an information recording medium with a track from which information can be readout optically with light emitted from a light source as at least three optical beams and receiving optical beams reflected from the information recording medium by photodetectors. The first tracking signal generating method includes: generating three position signals Sm, Ss1, and Ss2 corresponding to a positional relationship between the three optical beams and the track from signals obtained corresponding to the quantity of the optical beams entering the photodetectors; receiving the three position signals Sm, Ss1, and Ss2, calculating differences between Sm and Ss1 and between Sm and Ss2 with the position signal Sm being taken as a reference, executing calculation for correction, and generating two intermediate signals Sa and Sb so that they are different in phase by $\pi/2$ rad in a track crossing direction and have same amplitude levels; and synthesizing a zero-crossing tracking signal in an arbitrary phase with respect to the track from the intermediate signals Sa and Sb.

In the first tracking signal generating method, preferably the synthesizing of the zero-crossing tracking signal is executed by multiplying the two intermediate signals Sa and Sb by coefficients $\alpha$ and $\beta$ given by $\alpha = C \cdot \sin \phi$ and $\beta = C \cdot \cos \phi$ or $\alpha = C \cdot \cos \phi$ and $\beta = C \cdot \sin \phi$, where C and $\phi$ are constants, and adding them.

In order to achieve the above-mentioned object, a second tracking signal generating method according to the present invention is carried out by irradiating an information recording medium with a track from which information can be readout optically with light emitted from a light source as at least three optical beams and receiving optical beams reflected from the information recording medium by photodetectors. The second tracking signal generating method includes: generating three position signals Sm, Ss1, and Ss2 corresponding to a positional relationship between the three optical beams and the track from signals obtained corresponding to the quantity of the optical beams entering the photodetectors; multiplying the position signal Sm by a coefficient Fm1 to generate a signal Fm1·Sm; multiplying the position signal Sm by a coefficient Fm2 to generate a signal Fm2·Sm; multiplying the position signal Ss1 by a coefficient F1 to generate a signal F1·Ss1; multiplying the position signal Ss2 by a coefficient F2 to generate a signal F2·Ss2; calculating a difference signal Sa3 of the signals Fm1·Sm and F1·Ss1; calculating a difference signal Sb3 of the signals Fm2·Sm and F2·Ss2; and multiplying the difference signals Sa3 and Sb3 by predetermined coefficients and adding them, thus synthesizing a tracking signal. The coefficients Fm1, Fm2, F1, and F2 are determined so that the difference signals Sa3 and Sb3 have constant amplitude levels and are different in phase by $\pi/2$ rad in a track crossing direction.

In the second tracking signal generating method, preferably the coefficients Fm1, Fm2, F1, and F2 satisfy $Fm1/F1 = L1 \times (\cos \phi 1 + \sin \phi 1)/Lm$, $Fm2/F2 = L2 \times (\cos \phi 2 + \sin \phi 2)/Lm$, and $F1/F2 = L2 \times |\sin \phi 2|/(L1 \times |\sin \phi 1|)$, wherein $\phi 1$ denotes a phase difference between the position signals Sm and Ss1, $\phi 2$ a phase difference between the position signals Sm and Ss2, and Lm, L1, and L2 amplitudes of the position signals Sm, Ss1, and Ss2, respectively.

In the second tracking signal generating method, preferably the synthesizing of the tracking signal is executed by multiplying the two difference signals Sa3 and Sb3 by coefficients $\alpha$ and $\beta$ given by $\alpha = C \cdot \sin \phi$ and $\beta = C \cdot \cos \phi$ or $\alpha = C \cdot \cos \phi$ and $\beta = C \cdot \sin \phi$, where C and $\phi$ are constants, and adding them.

In order to achieve the above-mentioned object, a first magnetic recording/reproducing system according to the present invention includes a magnetic head, a light source for emitting light, an optical system, photodetectors, position signal generating sections, intermediate signal generating sections, and a signal synthesizing circuit. The magnetic head records or reproduces information with respect to an information recording medium with a track from which information can be readout optically. With the optical system, the information recording medium is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The intermediate signal generating sections receive the three position signals Sm, Ss1, and Ss2, calculate differences between Sm and Ss1 and between Sm and Ss2 with the position signal Sm being taken as a reference, execute calculation for correction, and generate two intermediate signals Sa and Sb. The signal synthesizing circuit synthesizes a zero-crossing tracking signal in an arbitrary phase with respect to the track from the intermediate signals Sa and Sb. The intermediate signal generating sections execute the correction so that the intermediate signals Sa and Sb have same amplitude levels and are different in phase by $\pi/2$ rad in a track crossing direction, and output them. Tracking control is carried out according to the tracking signal output from the signal synthesizing circuit.

In the first magnetic recording/reproducing system, preferably the signal synthesizing circuit multiplies the two intermediate signals Sa and Sb input thereinto by coefficients α and β given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and φ are constants, and adds them.

In order to achieve the above-mentioned object, a second magnetic recording/reproducing system according to the present invention includes a magnetic head, a light source for emitting light, an optical system, photodetectors, position signal generating sections, a first variable gain amplifier, a second variable gain amplifier, a third variable gain amplifier, a fourth variable gain amplifier, a first differential operational circuit, a second differential operational circuit, and a signal synthesizing circuit. The magnetic head records or reproduces information with respect to an information recording medium with a track from which information can be readout optically. With the optical system, the information recording medium is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The first variable gain amplifier has a coefficient Fm1, receives the position signal Sm, and outputs a signal Fm1·Sm. The second variable gain amplifier has a coefficient Fm2, receives the position signal Sm, and outputs a signal Fm2·Sm. The third variable gain amplifier has a coefficient F1, receives the position signal Ss1, and outputs a signal F1·Ss1. The fourth variable gain amplifier has a coefficient F2, receives the position signal Ss2, and outputs a signal F2·Ss2. The first differential operational circuit receives the signals Fm1·Sm and F1·Ss1 output from the first and third variable gain amplifiers and obtains a difference signal Sa3 of the signals Fm1·Sm and F1·Ss1. The second differential operational circuit receives the signals Fm2·Sm and F2·Ss2 output from the second and fourth variable gain amplifiers and obtains a difference signal Sb3 of the signals Fm2·Sm and F2·Ss2. The signal synthesizing circuit multiplies the difference signals Sa3 and Sb3 from the first and second differential operational circuits by predetermined coefficients and adds them, which is output as a tracking signal. The coefficients Fm1, Fm2, F1, and F2 are determined with respect to the first to fourth variable gain amplifiers so that the difference signals Sa3 and Sb3 have the same amplitude level and are different in phase by π/2 rad in a track crossing direction. Tracking control is carried out according to the tracking signal output from the signal synthesizing circuit.

In the second magnetic recording/reproducing system, preferably the respective coefficients Fm1, Fm2, F1, and F2 of the first to fourth variable gain amplifiers satisfy $$Fm1/F1 = L1 \times (\cos \phi1 + \sin \phi1)/Lm,$$

$$Fm2/F2 = L2 \times (\cos \phi2 + \sin \phi2)/Lm, \text{ and}$$

$$F1/F2 = L2 \times |\sin \phi2|/(L1 \times |\sin \phi1|),$$

wherein φ1 denotes a phase difference between the position signals Sm and Ss1, φ2 a phase difference between the position signals Sm and Ss2, and Lm, L1, and L2 amplitudes of the position signals Sm, Ss1, and Ss2, respectively.

In the second magnetic recording/reproducing system, preferably the signal synthesizing circuit multiplies the two difference signals Sa3 and Sb3 input thereinto by coefficients α and β given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and φ are constants, and adds them.

In order to achieve the above-mentioned object, a third magnetic recording/reproducing system according to the present invention includes a magnetic head, a light source for emitting light, an optical system, photodetectors, position signal generating sections, a first differential operational circuit, a second differential operational circuit, and a signal synthesizing circuit. The magnetic head records or reproduces information with respect to an information recording medium with a track from which information can be readout optically. With the optical system, the information recording medium is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The first differential operational circuit receives the position signals Sm and Ss1 and outputs a difference signal Sa thereof. The second differential operational circuit receives the position signals Sm and Ss2 and outputs a difference signal Sb thereof. The signal synthesizing circuit multiplies the difference signals Sa and Sb output from the first and second differential operational circuits, respectively, by predetermined coefficients α and β and adds them, which is output as a tracking signal. The coefficients α and β are given by $$\alpha = (C \cdot \cos \phi)/La \text{ and}$$

$$\beta = (C \cdot \sin \phi)/Lb$$

or $$\alpha = (C \cdot \sin \phi)/La \text{ and}$$

$$\beta = (C \cdot \cos \phi)/Lb,$$

wherein La and Lb denote amplitudes of the difference signals Sa and Sb, respectively, and C and φ are constants. Tracking control is carried out according to the tracking signal output from the signal synthesizing circuit.

In order to achieve the above-mentioned object, a fourth magnetic recording/reproducing system according to the present invention includes a magnetic head, a light source for emitting light, an optical system, photodetectors, position signal generating sections, a first differential operational circuit, a second differential operational circuit, a signal synthesizing circuit, and a variable gain amplifier. The magnetic head records or reproduces information with respect to an information recording medium with a track from which information can be readout optically. With the optical system, the information recording medium is irradiated with the light emitted from the light source as at least three optical beams. The photodetectors receive optical beams reflected from the information recording medium. The position signal generating sections output three position signals Sm, Ss1, and Ss2 corresponding to a positional relationship between the three optical beams and the track from signals obtained corresponding to the quantity of the optical beams entering the photodetectors. The first differential operational circuit receives the position signals Sm and Ss1 and outputs a difference signal Sa thereof. The second differential operational circuit receives the position signals Sm and Ss2 and outputs a difference signal Sb thereof. The signal synthesizing circuit multiplies the difference signals Sa and Sb output from the first and second differential operational circuits, respectively, by predetermined coefficients and adds them. The variable gain amplifier receives a signal output from the signal synthesizing circuit and multiplies it by a suitable coefficient, which is output as a tracking signal. In the variable gain amplifier, the suitable coefficient is determined so that the signal input into the variable gain amplifier has a predetermined amplitude level during track crossing. Tracking control is carried out according to the tracking signal output from the variable gain amplifier.

According to the above-mentioned configurations, even when the three optical beams are not aligned on a straight line, an ideal tracking error signal with a constant amplitude level can be obtained and the variation in gain of tracking servo can be suppressed to 0 dB, thus achieving stable tracking control. As a result, signals can be readout with a low error ratio.

Since the shift of the three beams from the straight line is acceptable, high precision alignment of the optical system is not required, thus reducing the cost of the optical system. In addition, since variations in the alignment are acceptable, the degree of freedom in design of the optical system is increased.

Further, even when the angle formed between the track and the beam row formed of three optical beams is different from an ideal angle, a tracking error signal with a constant amplitude is obtained. Therefore, it is not required to adjust the angle formed between the beam row and the track, thus reducing the manufacturing cost of the magnetic recording/reproducing system using this tracking signal generating device.

In addition to the case where the angle formed between the beam row and the track is different from an ideal angle θ0, even in a case where the amplitude levels of the signals output from the photodetectors vary, a tracking error signal with a constant amplitude can be obtained. Therefore, adjustment of not only the angle formed between the beam row and the track but also the amplitude levels becomes unnecessary, thus reducing the manufacturing cost of the magnetic recording/reproducing system using this tracking signal generating device.

DETAILED DESCRIPTION OF THE INVENTION

Preferred embodiments of the present invention are described with reference to FIGS. 1 to 14 as follows.

First Embodiment

A first embodiment is directed to a configuration with which a tracking signal with a constant amplitude level can be obtained even when three beams are not aligned on a straight line on a disk 107.

Figure 1:
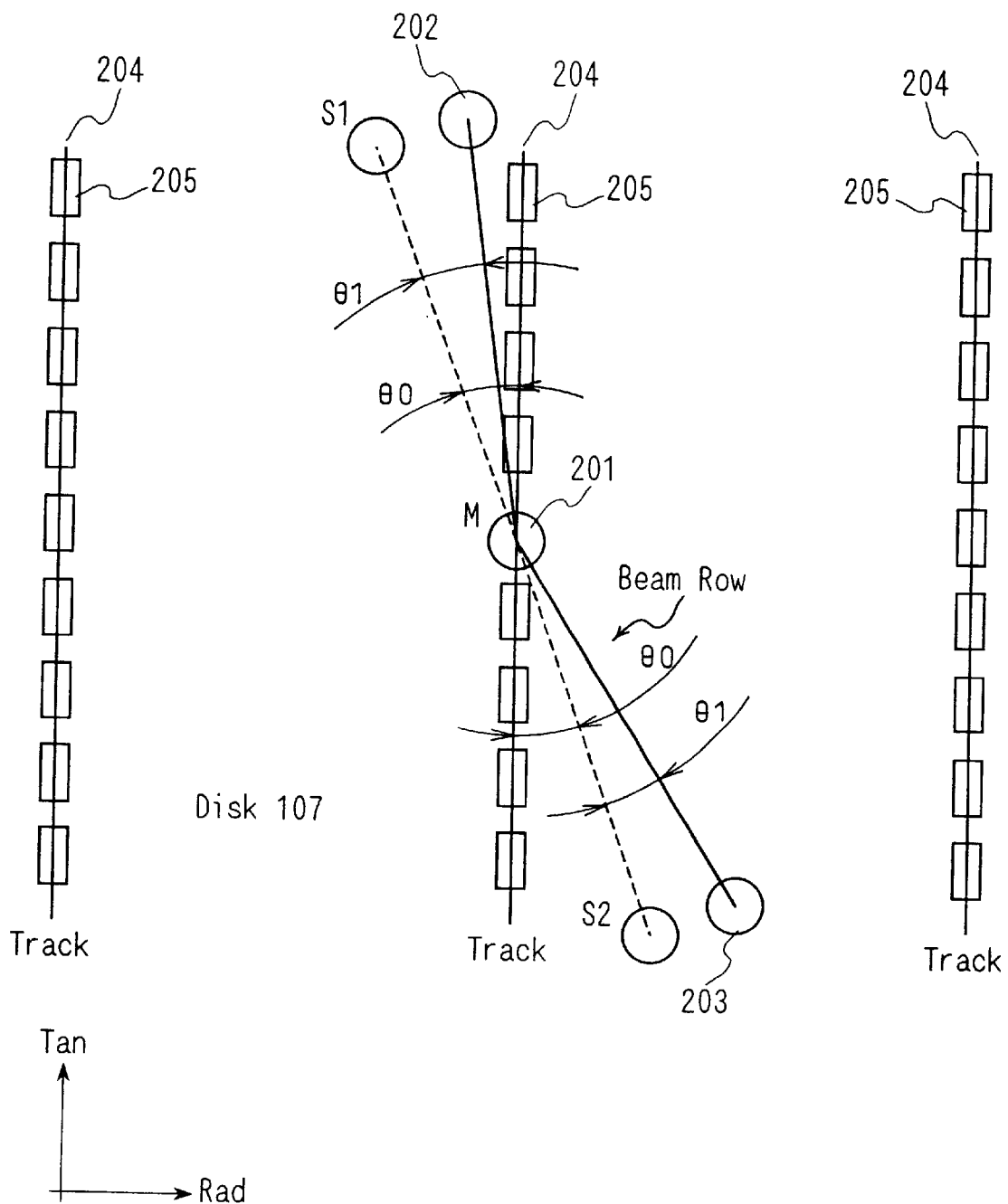
FIG. 1 is a schematic view showing the positional relationship between a track and main and sub-beams on a disk, which is assumed in a first embodiment of the present invention.

FIG. 1 shows the positional relationship between beams on the disk 107 according to the present embodiment. As shown in FIG. 1, when a beam row formed of a main beam (M) 201, a sub-beam (S1) 202, and a sub-beam (S2) 203 is shifted by an angle θ1 from the aligned state, the amplitude level of a tracking error signal TE varies depending on the value of $\phi j$ in a conventional tracking signal generating device.

The following description is directed to a configuration of a tracking signal generating device achieving a stable tracking control even when the tracking control is carried out in an arbitrary phase φj.

In the conventional configuration, three beams are arranged so that in Eq. 4 mentioned above, $$\phi1=\phi2=\pi/2$$

holds. According to the gain ratio of I–V amplifiers, $$Lm=L1=L1$$

holds. In this case, from Eq. 7 and Eq. 8 mentioned above, $$La=Lb \text{ and}$$

$$\phi a=-\phi b=\pi/4$$

hold. In other words, difference signals Sa and Sb are individual sine waves with the same amplitude level and different phases from each other by π/2. When a tracking error signal TE is synthesized from such difference signals Sa and Sb using Eq. 11, the amplitude level of the tracking error signal TE becomes constant. Even when the signal TE is synthesized with respect to an arbitrary phase φj, the amplitude level does not vary.

In the conventional example, however, when three beams are not aligned on the disk 107, for example, as shown in FIG. 1, the amplitude of the tracking error signal TE varies depending on the phase φj. Consequently, a margin for the tracking control operation is reduced, resulting in an unstable tracking operation.

Figure 4:
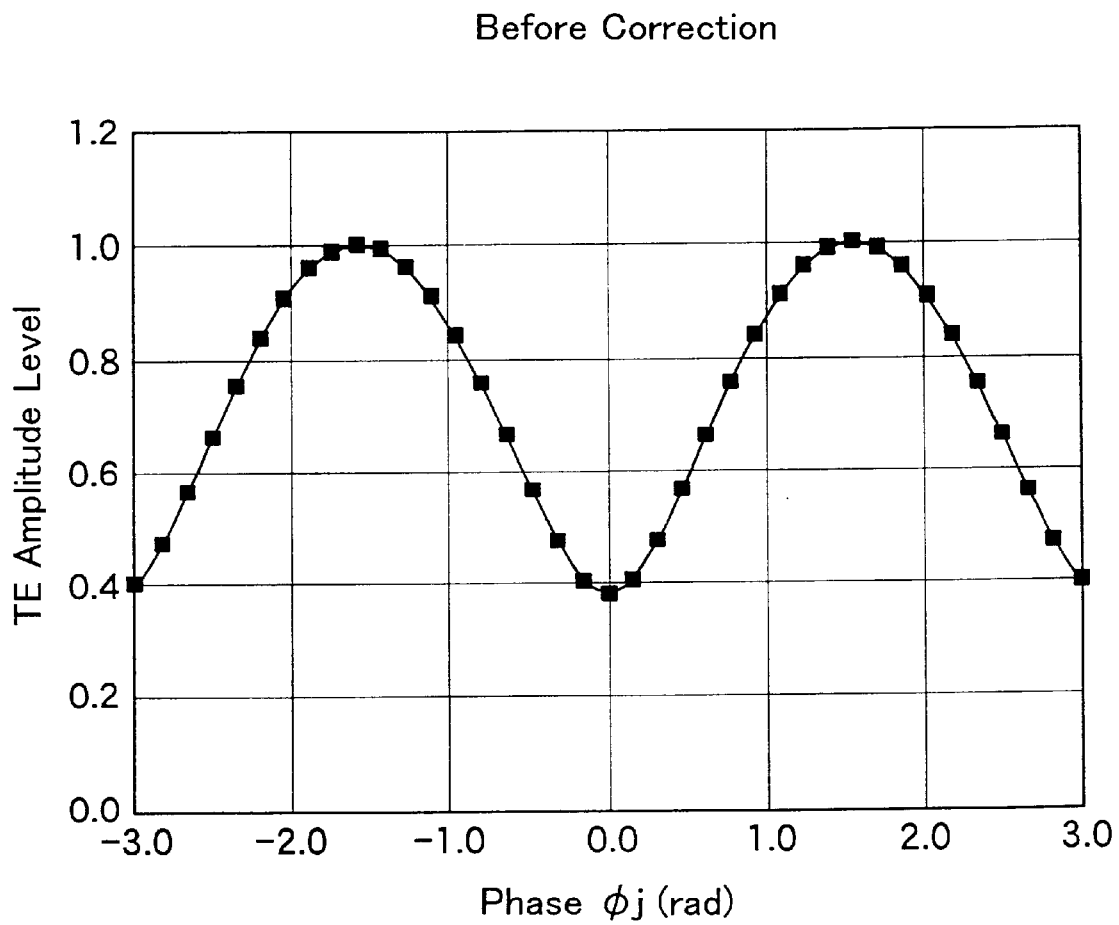
FIG. 4 is a graph showing variations in TE amplitude level before correction according to the first embodiment of the present invention.

This is described with a specific example. The respective beam intervals l between the main beam 201 and the sub-beams 202 and 203 are set to be 120 μm, and the intervals Tp between two adjacent tracks are set to be 20.4 μm. When the beams are aligned on a straight line (which is indicated by a broken line in FIG. 1), an optimum angle θ0 of the beam row with respect to a track 204 on the disk 107 is 2.44°. In this case, when the angle θ1 by which the beam row is shifted from the straight line is 1.32°, in the conventional method, the amplitude level of a tracking error signal TE varies between about 0.4 and 1.0 depending on the phase for synthesizing the signal as shown in FIG. 4. In this case, the gain of the tracking servo varies by 8.6 dB, which hinders stable tracking control.

This is because the difference in phase between the signals Sa and Sb varies and their amplitude levels also vary. Through the rotational movement of three beams that are not positioned on one straight line, the difference in phase between the signals Sa and Sb can be changed to be 90 degrees. In this case, however, the signals Sa and Sb are different in amplitude level. Therefore, when the signal TE is synthesized from the signals Sa and Sb by the conventional method, its amplitude varies depending on the phase.

Figure 2:
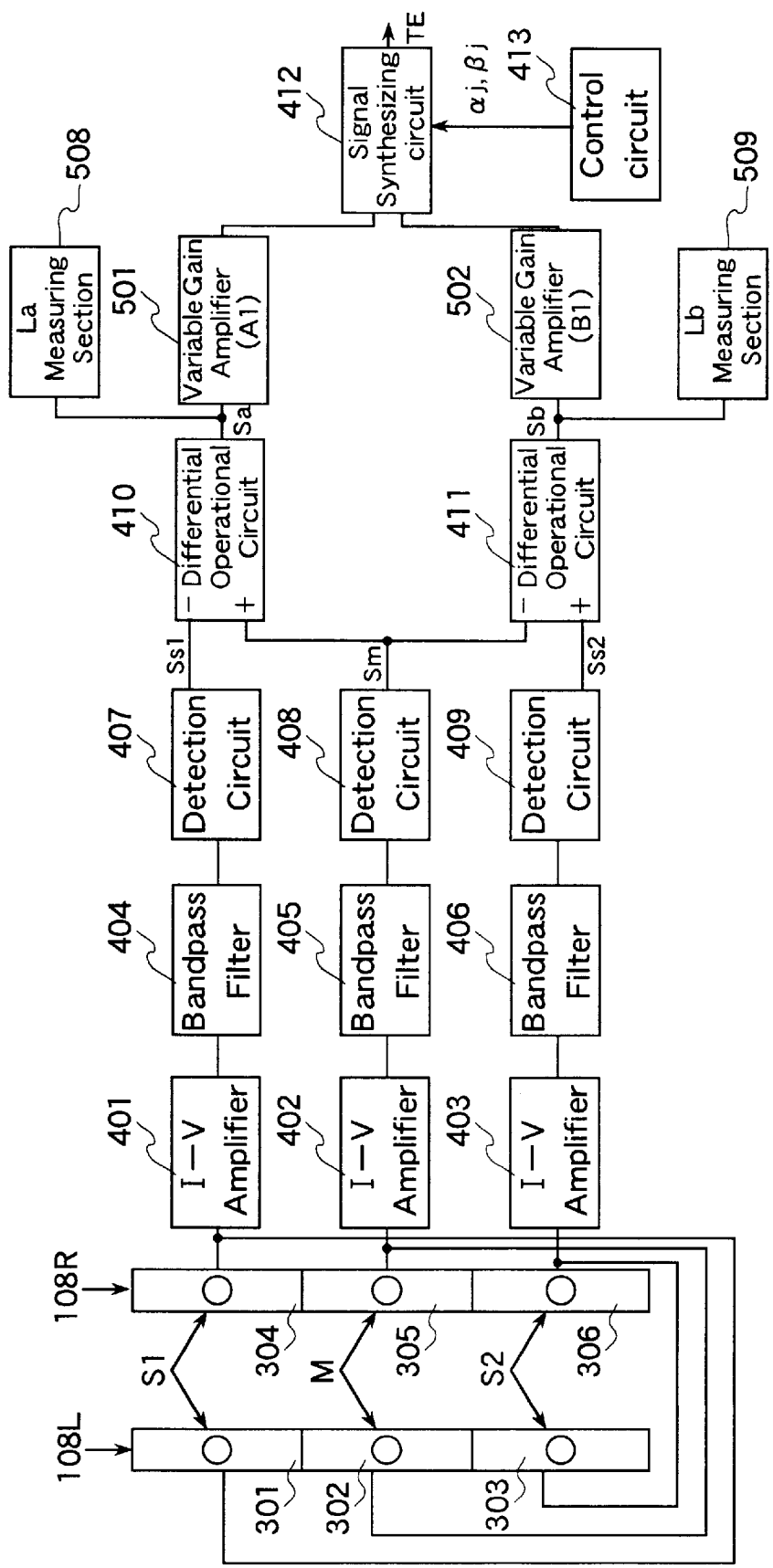
FIG. 2 is a block diagram showing a configuration of a tracking signal generating device according to the first embodiment of the present invention.
Figure 17:
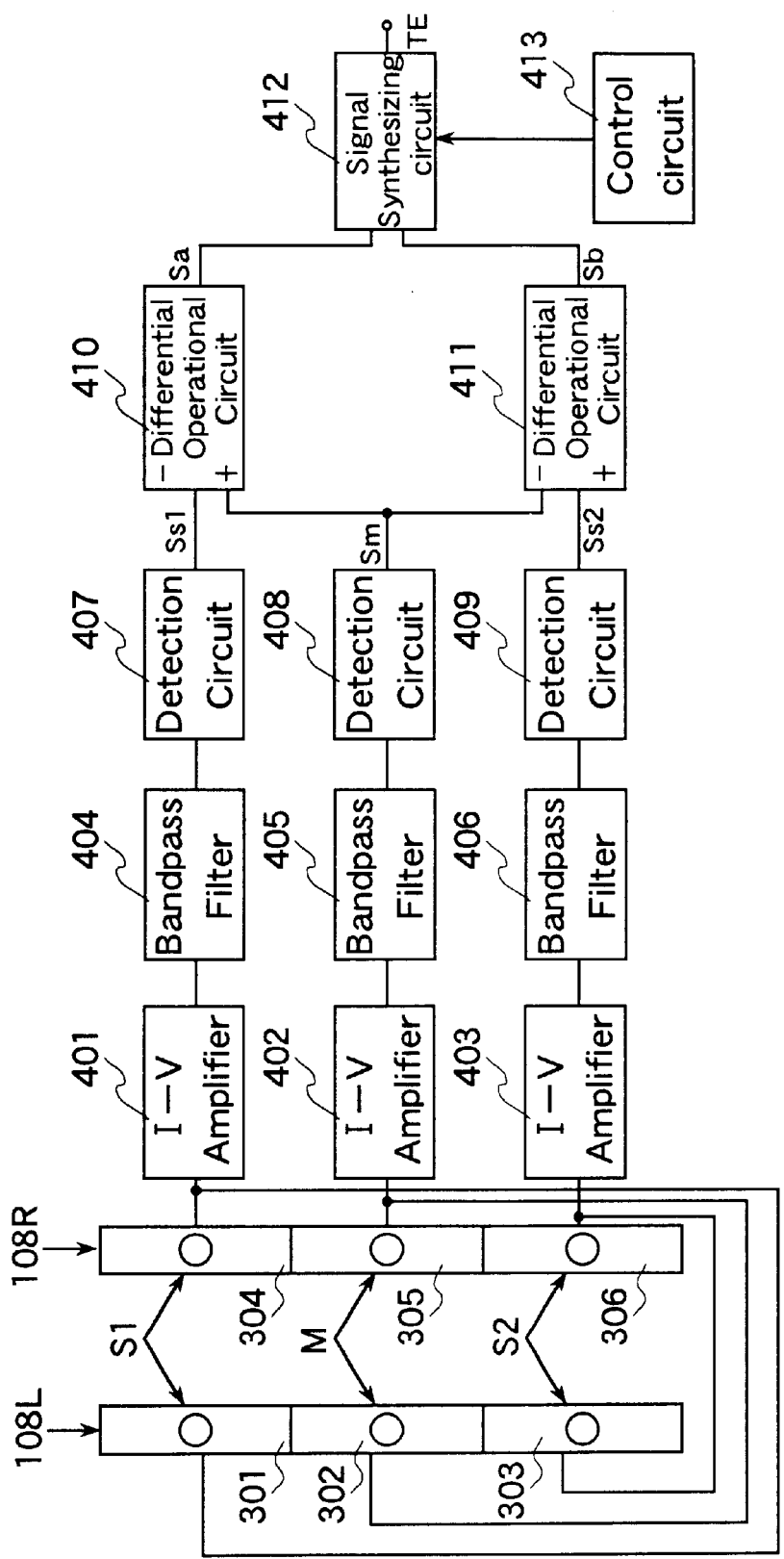
FIG. 17 is a block diagram showing a configuration of the tracking signal generating device according to the conventional technique.

FIG. 2 shows a block diagram of a tracking signal generating device according to the first embodiment of the present invention. The present embodiment is different from the conventional example (shown in FIG. 17) in that there are provided variable gain amplifiers 501 and 502 receiving output signals from differential operational circuits 410 and 411, respectively, and a signal synthesizing circuit 412 receives outputs of the variable gain amplifiers 501 and 502.

The variable gain amplifier 501 receives a signal Sa from the differential operational circuit 410 and multiplies the difference signal Sa by a coefficient A1 according to the shift angle θ1 of the beam row with respect to the straight line. This coefficient A1 is set based on an amplitude La of the difference signal Sa measured by a La measuring section 508. Similarly, the variable gain amplifier 502 receives a difference signal Sb from the differential operational circuit 411 and multiplies the difference signal Sb by a coefficient B1 according to the shift angle θ1. The coefficient B1 is set based on an amplitude Lb of the difference signal Sb measured by a Lb measuring section 509. In this case, the ratio of the coefficient A1 to the coefficient B1 is set to be equal to the ratio of the amplitude level Lb of the signal Sb to the amplitude level La of the signal Sa.

In other words, in $$TE=\alpha\times Sa+\beta\times Sb=A1\times\alpha j\times Sa+B1\times\beta j\times Sb, \quad \text{Eq. 16}$$

A1 and B1 are set to satisfy $$A1=C/La \text{ and} \quad \text{Eq. 17}$$

$$B1=C/Lb, \quad \text{Eq. 18}$$

wherein C denotes a constant, La an amplitude level of the signal Sa, and Lb an amplitude level of a signal Sb.

Next, the following description is directed to a procedure for determining the coefficients αj, βj, A1 and B1 to obtain a tracking error signal TE.

Figure 3:
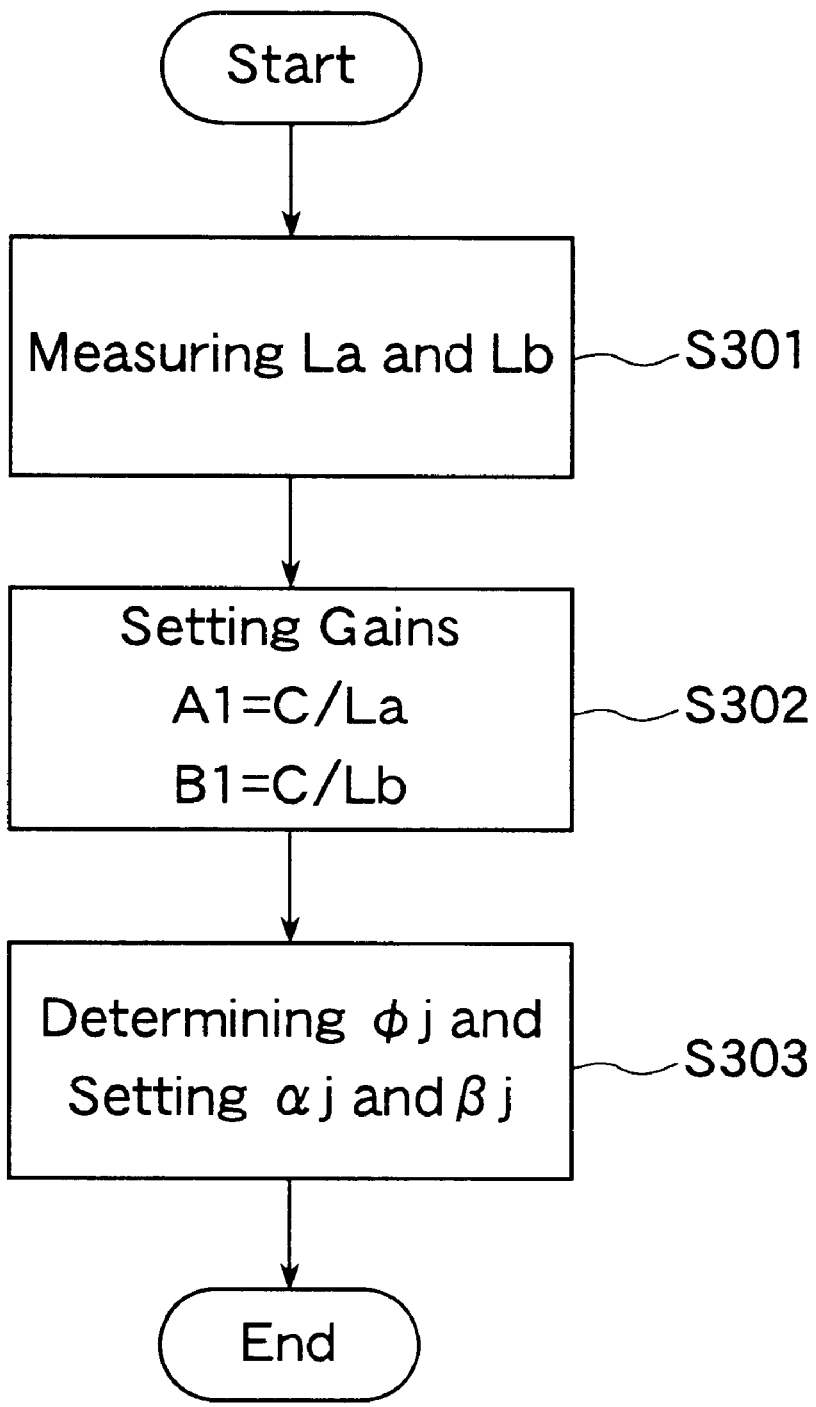
FIG. 3 is a flow chart showing a procedure for generating a tracking signal according to the first embodiment of the present invention.

FIG. 3 is a flow chart showing the procedure for generating a tracking signal in the first embodiment of the present invention. Initially, the spots M, S1, and S2 are moved radially with respect to the track, and the amplitude La of the difference signal Sa is measured in the La measuring section 508 shown in FIG. 2 and the amplitude Lb of the difference signal Sb in the Lb measuring section 509 (Step S301). Then, according to the amplitudes La and Lb thus measured, gains are set to be A1=C/La and B1=C/Lb with respect to the variable gain amplifiers 501 and 502, respectively (Step S302). Finally, as described in the conventional technique, the phase φj is determined through learning in the control circuit 413 and the coefficients αj and βj are set with respect to the signal synthesizing circuit 412 (Step S303), and thus the tracking error signal TE is generated.

Thus, A1×Sa and B1×Sb as intermediate signals of outputs from the variable gain amplifiers 501 and 502, respectively, have the same amplitude level and are different in phase in the direction perpendicular to the track by 90 degrees. As a result, the synthesized signal TE has a constant amplitude level irrespective of the phase φj.

Figure 5:
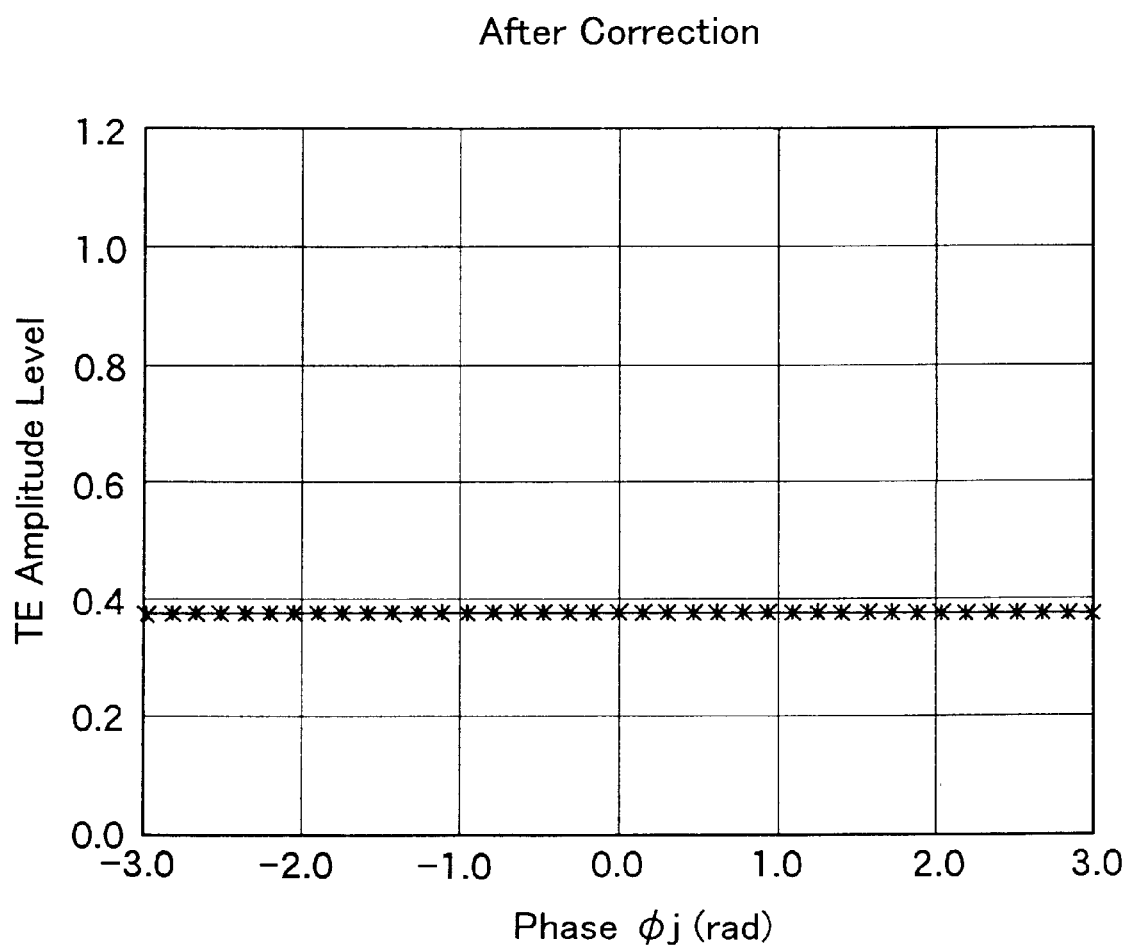
FIG. 5 is a graph showing variations in TE amplitude level after the correction according to the first embodiment of the present invention.

When it is assumed that the present embodiment is applied to the aforementioned specific example, the beam intervals l are 120 μm, the intervals Tp between two adjacent tracks are 20.4 μm, and the angle θ0 of a beam row with respect to the track 204 on the disk 107 is 2.44°. In this case, when the shift angle θ1 of the beam row with respect to the straight line is 1.32°, the constant C and the gain coefficients A1 and B1 may be set to be 0.66, and 0.936 and 0.35, respectively. In this case, as shown in FIG. 5, an ideal tracking error signal TE with a constant amplitude level is obtained.

Thus, according to the present embodiment, the variation in a gain of the tracking servo of 8.6 dB can be suppressed to 0 dB. Therefore, stable tracking control can be achieved and thus signals can be readout at a low error rate.

Furthermore, the shift of three beams from a straight line is acceptable and therefore, the high precision alignment of the optical system is not required, thus reducing the cost of the optical system. In addition, the variations in the alignment also are acceptable and thus the degree of freedom in the optical system design is increased.

In the present embodiment, the variable gain amplifiers are provided as hardware but also can be provided by means of software. Similarly in that case, the same effects as in the present embodiment can be obtained.

Moreover, in the present embodiment, the variable gain amplifiers are described as components outside a gain section of the signal synthesizing circuit, but may be integrated with the signal synthesizing circuit. Similarly in this case, the same effects as in the present embodiment can be obtained by using the coefficients α and β as described in the present embodiment instead of the conventional coefficients αj and βj.

Second Embodiment

Next, the following description is directed to a configuration of a second embodiment in the case where an angle formed between a track 204 and a beam row of three beams aligned on one straight line on a disk 107 is shifted from an ideal angle. The same elements as in the first embodiment are indicated with the same numerals and characters.

Figure 6:
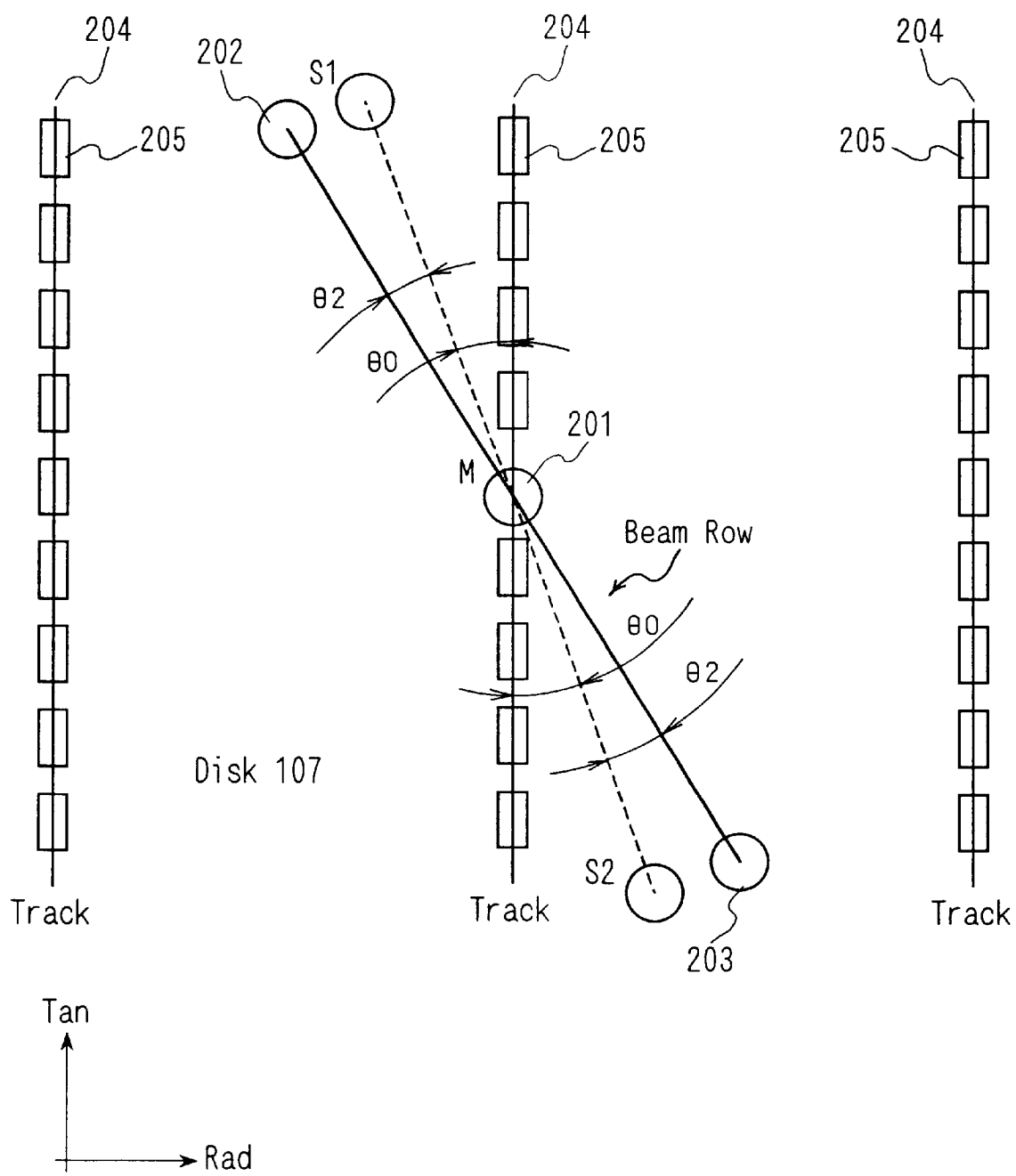
FIG. 6 is a schematic view showing the positional relationship between a track and main and sub-beams on a disk, which is assumed in a second embodiment of the present invention.

As shown in FIG. 6, suppose that a beam row formed of a main beam 201 and two sub-beams 202 and 203 is rotated by an angle θ2 from the angle θ0 with respect to the track 204. In this case, the angle θ0 satisfies l×sin (θ0)/Tp=¼. When θ2 is not zero, the amplitude level of a tracking error signal TE varies according to a phase φj for synthesizing the signal. As a result, a stable tracking operation cannot be achieved by the conventional method.

Figure 7:
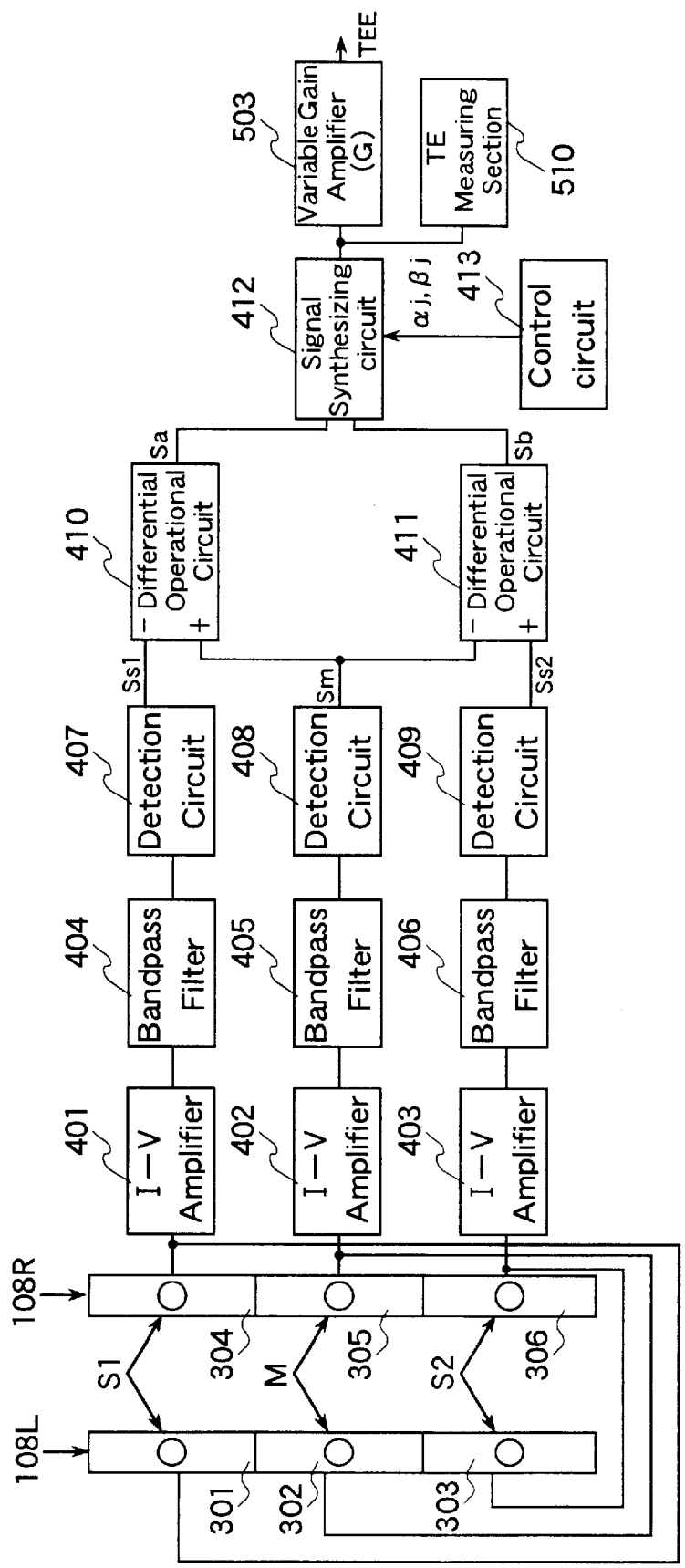
FIG. 7 is a block diagram showing a configuration of a tracking signal generating device according to the second embodiment of the present invention.

FIG. 7 is a block diagram of a tracking signal generating device according to the second embodiment of the present invention. In this device, a variable gain amplifier 503 is provided after the conventional signal synthesizing circuit 412. The tracking error signal TE (Eq. 11) output from the signal synthesizing circuit 412 is multiplied by a coefficient G depending on the phase φj to obtain a tracking error signal TEE. The tracking error signal TEE is expressed by the following relative equations:

$TEE = G \times TE$ and  Eq. 19

$G = 1/TE.$  Eq. 20

Specifically, the coefficient G varies depending on the phase for synthesizing the signal and therefore, is stored in a table-like memory related to the phase. The value of the coefficient G can be defined as the inverse number of TE as expressed in Eq. 20.

The following description is directed to a procedure for determining the coefficients αj, βj, and G to obtain the tracking error signal TEE.

Figure 8:
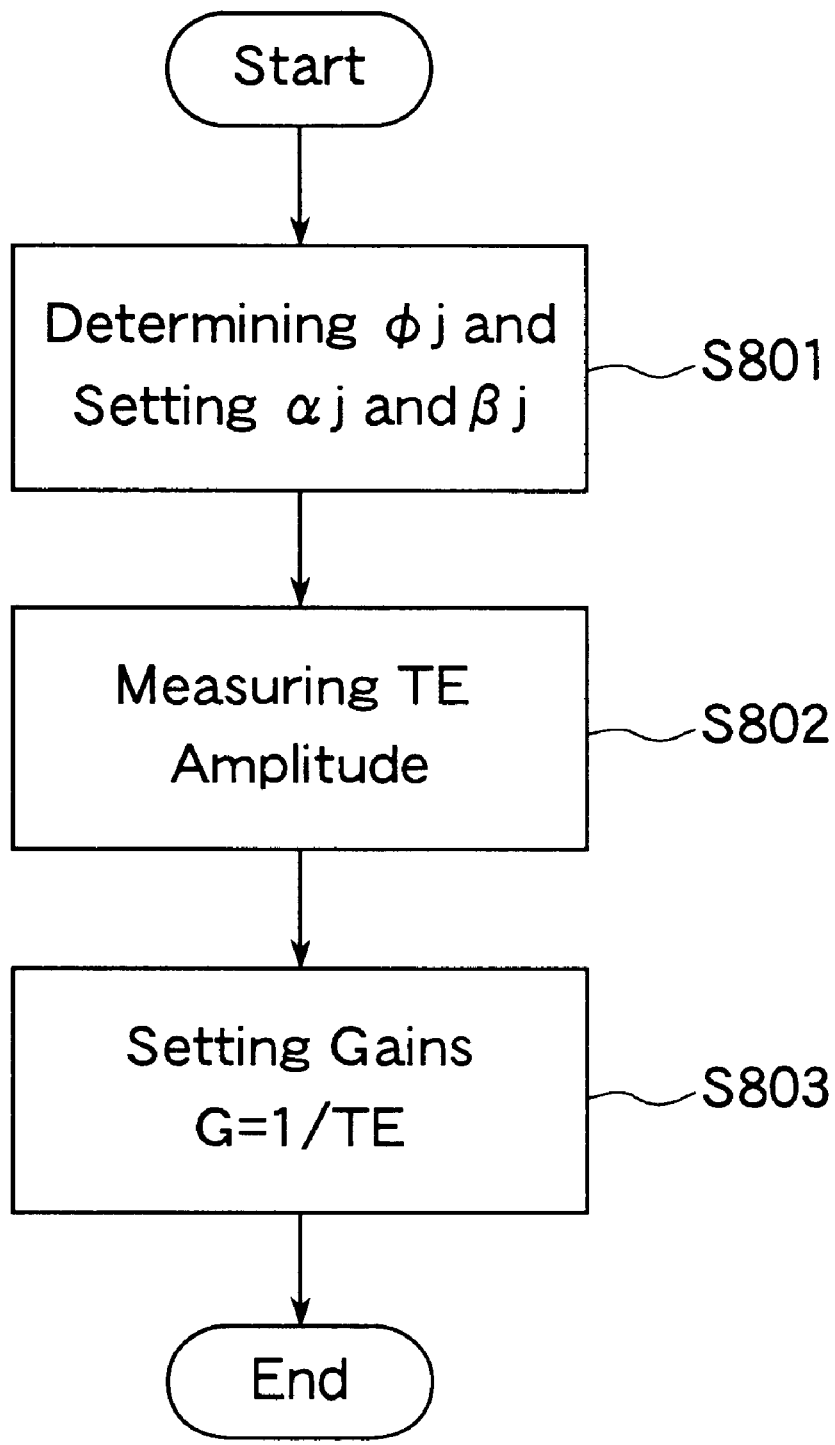
FIG. 8 is a flow chart showing a procedure for generating a tracking signal according to the second embodiment of the present invention.

FIG. 8 is a flow chart showing a procedure for generating a tracking signal in the second embodiment of the present invention. Initially, the phase φj is determined through learning in a control circuit 413 and the coefficients αj and βj are set with respect to the signal synthesizing circuit 412 (Step S801). Next, spots M, S1, and S2 are moved radially with respect to the track and the amplitude of the signal TE as an output of the signal synthesizing circuit 412 is measured in a TE measuring section 510 shown in FIG. 7 (Step S802). Finally, according to the TE amplitude thus measured, a gain is set to be G=1/TE with respect to the variable gain amplifier 503 (Step S803). As a result, the tracking error signal TEE is generated.

Next, a specific example of the present embodiment is described as follows.

Figure 9:
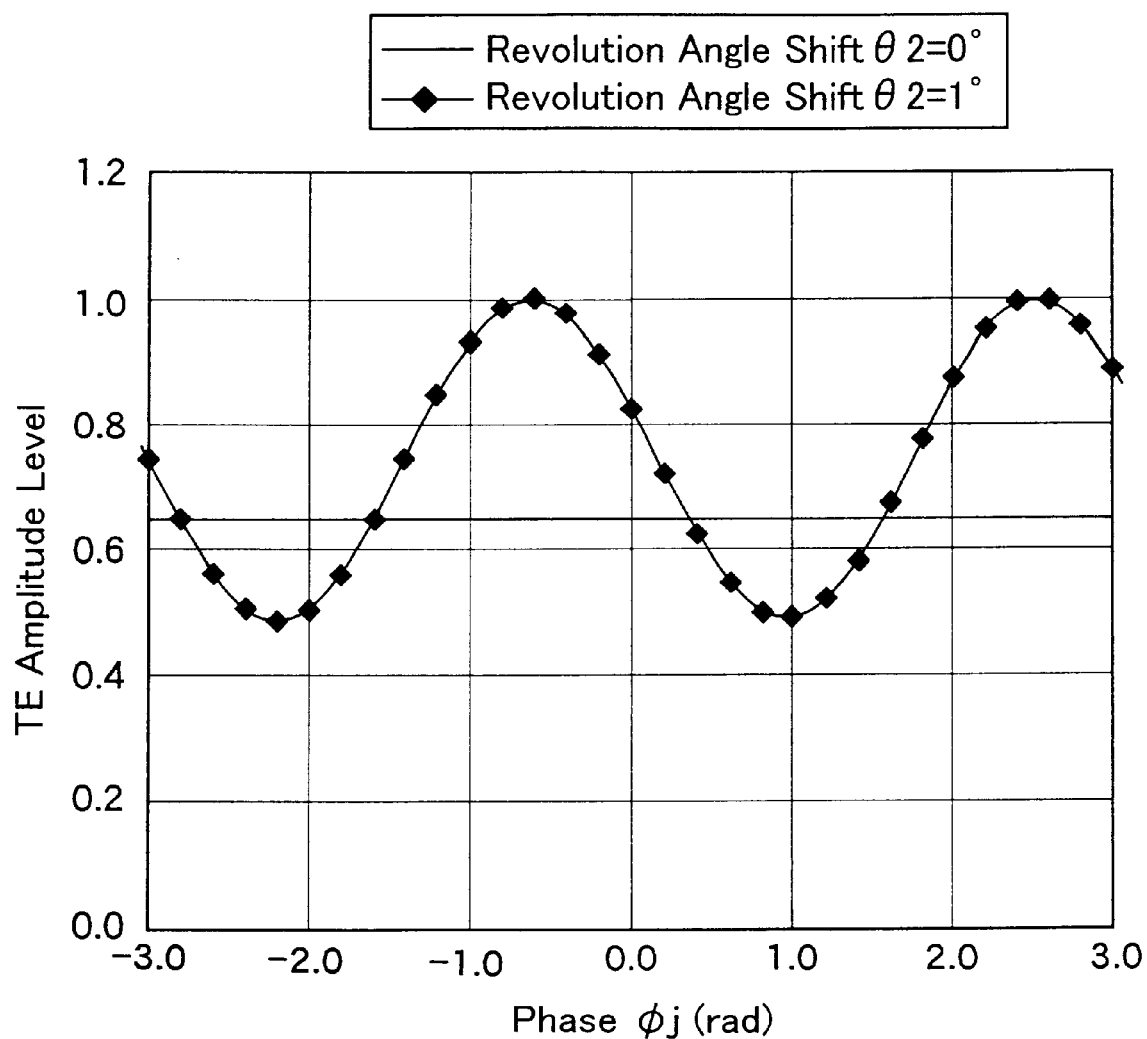
FIG. 9 is a graph showing variations in TE amplitude level when a revolution angle is shifted and it is not shifted, according to the second embodiment of the present invention.

When respective beam intervals l between the main beam 201 and the sub-beams 202 and 203 are 120 μm and the intervals Tp between two adjacent tracks are 20.4 μm, the angle θ0 of the beam row with respect to the track 204 on the disk 107 is 2.44°. In this case, when a shift in revolution angle occurs, the amplitude level of the tracking error signal TE varies in the conventional method as shown in FIG. 9.

Figure 10:
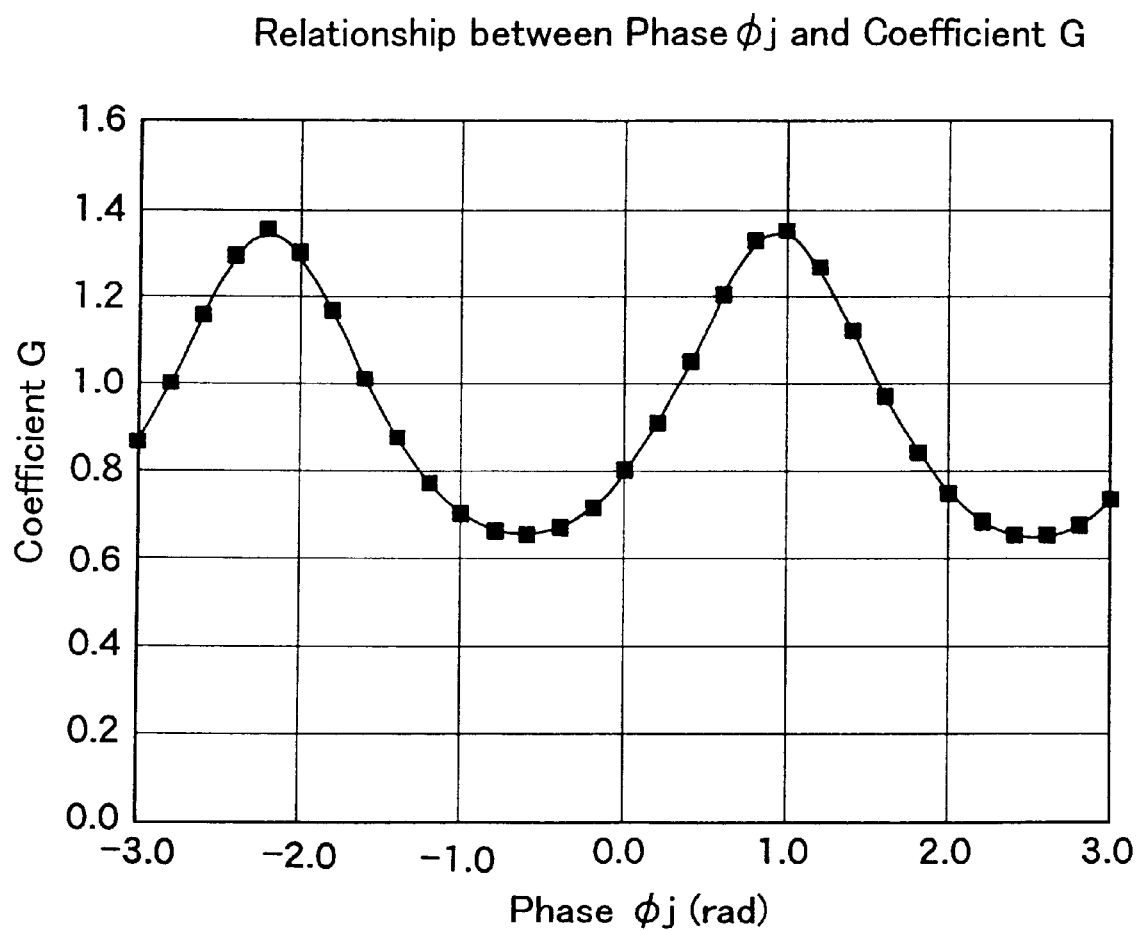
FIG. 10 is a graph showing variations of a correction factor G with respect to a phase $\phi j$ according to the second embodiment of the present invention.
Figure 11:
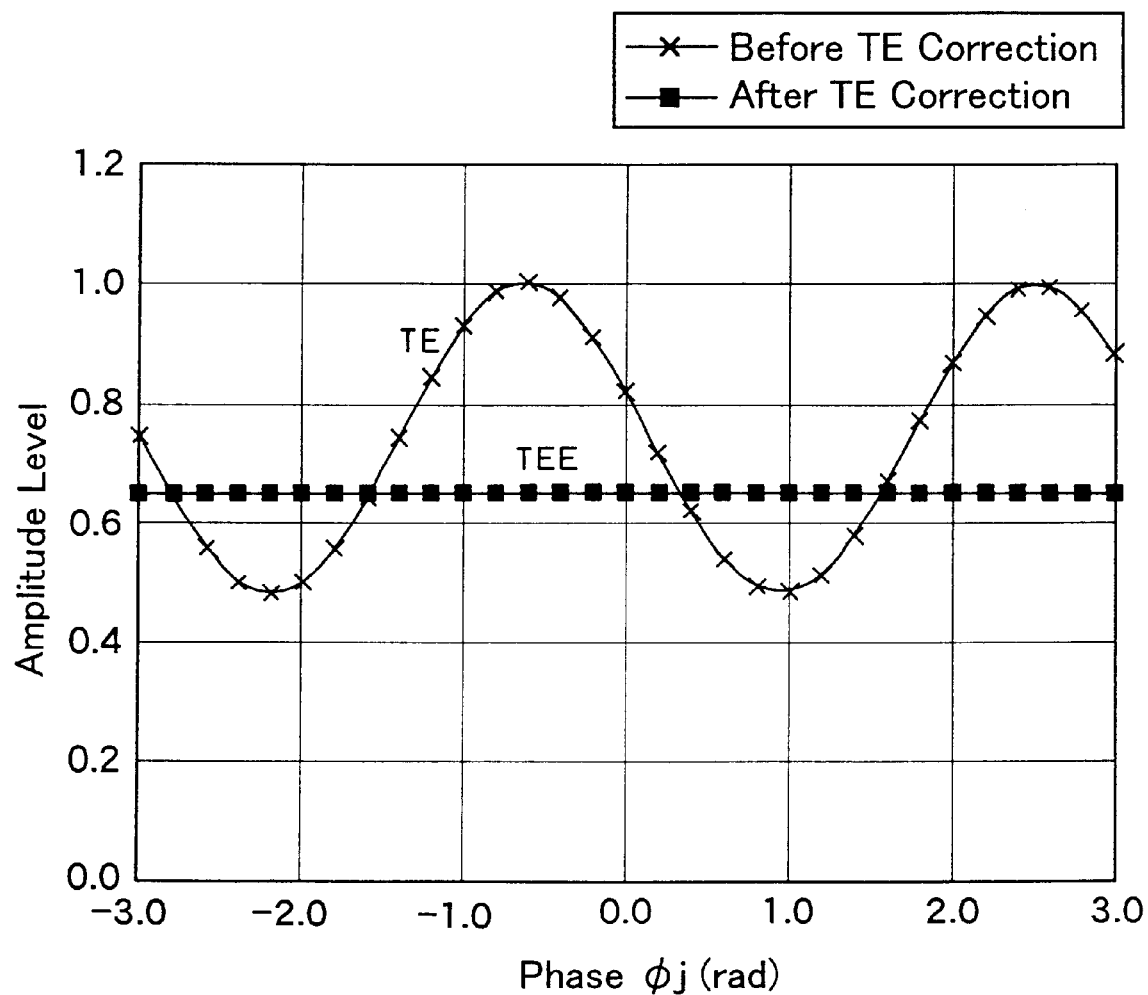
FIG. 11 is a graph showing variations in TE amplitude level before correction and in TEE amplitude level after the correction according to the second embodiment of the present invention.

When the present embodiment described above is applied, the coefficient G varies with respect to the phase φj as shown in FIG. 10 when the revolution angle shift θ2 is 1°. When the tracking error signal TE is multiplied by this coefficient G, the amplitude level of the tracking error signal TEE becomes an ideal one that is constant with respect to the phase φj as shown in FIG. 11.

Thus, according to the present embodiment, even when the angle formed between the beam row of three beams and the track is shifted from an ideal angle θ0, a tracking error signal with a constant amplitude can be obtained. Consequently, it is not required to adjust the angle formed between the track and the beam row of the three beams, thus reducing manufacturing cost of a magnetic recording/reproducing system using this tracking signal generating device.

Furthermore, the present embodiment provides the same effects when the three beams are shifted from the straight line, which was assumed in the first embodiment.

Third Embodiment

The following description is directed to a tracking signal generating device according to a third embodiment, which simultaneously solves the problems in that the angle formed between a track 204 and a beam row of three beams on a disk 107 is shifted from an ideal angle and when the amplitude levels of detection signals output from detectors 108R and 108L vary. The same elements as in the first and second embodiments are indicated with the same numerals and characters.

As shown in FIG. 6 used for the description of the second embodiment, when the beam row is rotated by an angle θ2 from the angle θ0 with respect to the track 204 and the amplitude levels Lm, L1, and L2 of the detection signals output from the detectors 108R and 108L, which are expressed by Eq. 1 to Eq. 3, are not equal, a stable tracking error signal TE cannot be obtained by the conventional method. An example of the present embodiment for solving this problem is described as follows.

Figure 12:
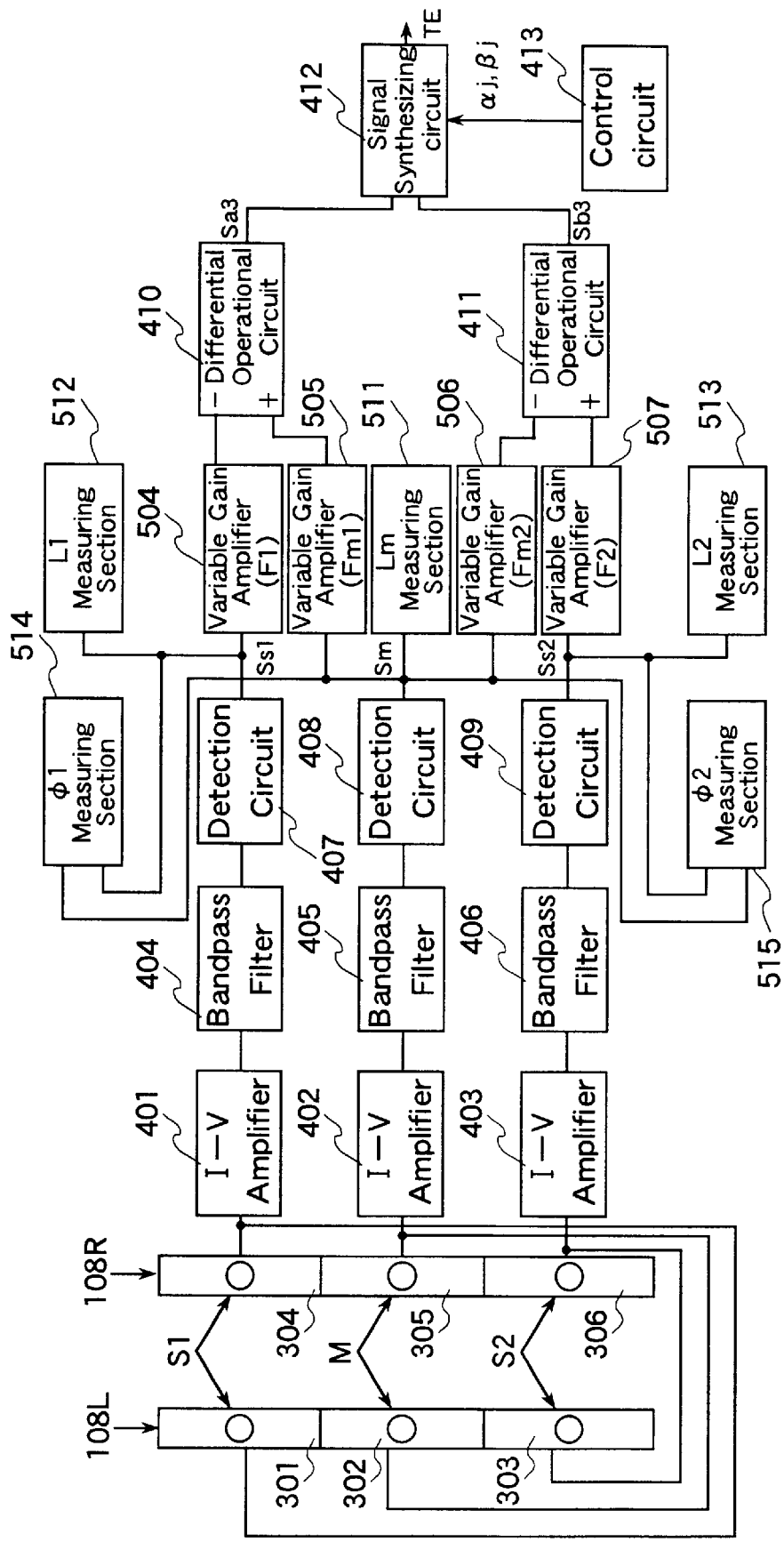
FIG. 12 is a block diagram showing a configuration of a tracking signal generating device according to a third embodiment of the present invention.

FIG. 12 is a block diagram of a tracking signal generating device according to the third embodiment of the present invention. The present embodiment is different from the conventional example (FIG. 17) in that there are provided variable gain amplifiers 504, 505, 506, and 507 receiving output signals from detection circuits 407, 408, and 409, a differential operational circuit 410 receives output signals of the variable gain amplifiers 504 and 505, and a differential operational circuit 411 receives output signals of the variable gain amplifiers 506 and 507.

The variable gain amplifier 504 receives a signal Ss1 from the detection circuit 407 and multiplies the signal Ss1 by a coefficient F1 depending on a shift from an ideal state. Similarly, the variable gain amplifier 505 receives a signal Sm from the detection circuit 408 and multiplies the signal Sm by a coefficient Fm1. Further, the variable gain amplifier 506 receives a signal Sm from the detection circuit 408 and multiplies the signal Sm by a coefficient Fm2, and the variable gain amplifier 507 receives a signal Ss2 from the detection circuit 409 and multiplies the signal Ss2 by a coefficient F2, and then the result is output.

When the output signal from the differential operational circuit 410 as an intermediate signal generation section is taken as an intermediate signal (a difference signal) Sa3, and the output signal from the differential operational circuit 411 as another intermediate signal generation section as an intermediate signal (a difference signal) Sb3, Sa3 and Sb3 are expressed by $Sa3 = Fm1 \times Sm - F1 \times Ss1$ and  Eq. 21

$Sb3 = F2 \times Ss2 - Fm2 \times Sm.$  Eq. 22

The correction operational coefficients Fm1, Fm2, F1, and F2 are determined as follows.

In this case, with respect to the phase $\phi m$ of the main beam 201, a phase $\phi a3$ of the difference signal Sa3 is set to have a shift of $-3/4\cdot\pi$ and a phase $\phi b3$ of the difference signal Sb3 is set to have a shift of $-1/4\cdot\pi$. In other words, the difference in phase between the difference signals Sa3 and Sb3 is set to be $\pi/2$. In addition, the coefficients are determined so that amplitude |Sa3|=|Sb3| holds.

When the above-mentioned conditions are applied to Eq. 21 and Eq. 22, the correction operational coefficients Fm1, Fm2, F1, and F2 satisfy $$Fm1/F1 = L1 \times (\cos \phi1 + \sin \phi1)/Lm, \qquad \text{Eq. 23}$$

$$Fm2/F2 = L2 \times (\cos \phi2 + \sin \phi2)/Lm, \text{ and} \qquad \text{Eq. 24}$$

$$F1/F2 = L2 \times |\sin \phi2|/(L1 \times |\sin \phi1|). \qquad \text{Eq. 25}$$

As described above, the relationships among the four coefficients Fm1, Fm2, F1, and F2 are expressed by the three equations and the amplitude of the tracking error signal TE is determined by the coefficients.

Next, the description is directed to a procedure for determining the above-mentioned coefficients Fm1, Fm2, F1, and F2 and coefficients $\alpha j$ and $\beta j$ to obtain the tracking error signal TE.

Figure 13:
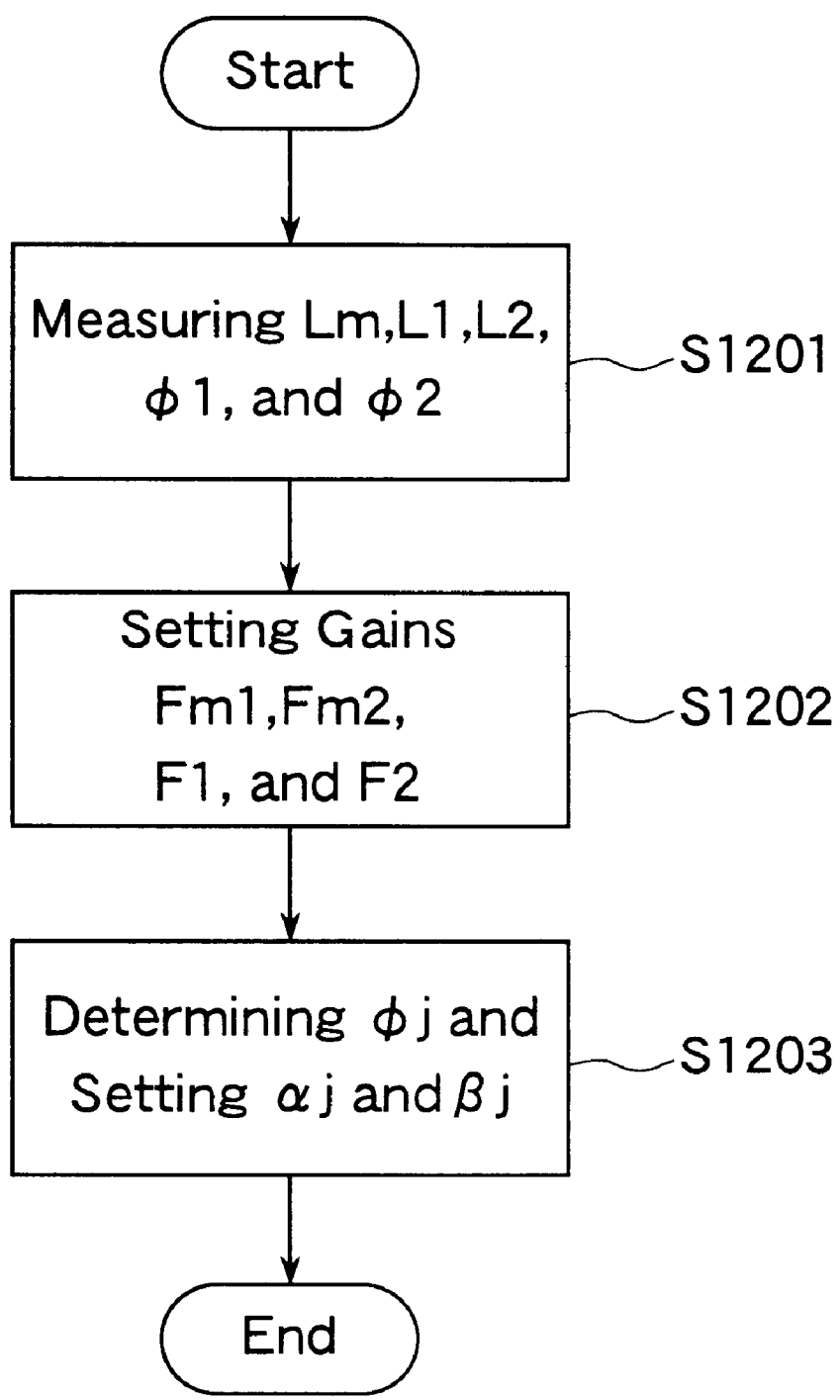
FIG. 13 is a flow chart showing a procedure for generating a tracking signal according to the third embodiment of the present invention.

FIG. 13 is a flow chart showing a procedure for generating a tracking signal according to the third embodiment of the present invention. Initially, spots M, S1, and S2 are moved radially with respect to a track, an amplitude Lm of the signal Sm is measured by a Lm measuring section 511, an amplitude L1 of the signal Ss1 is measured by a L1 measuring section 512, an amplitude L2 of the signal Ss2 is measured by a L2 measuring section 513, the phase $\phi1$ of the signal Ss1 with respect to the signal Sm is measured by a $\phi1$ measuring section 514, and the phase $\phi2$ of the signal Ss2 with respect to the signal Sm is measured by a $\phi2$ measuring section 515 as shown in FIG. 12 (Step S1201). Then, with Lm, L1, L2, $\phi1$ and $\phi2$ thus measured, the coefficients Fm1, Fm2, F1 and F2 are calculated using Eq. 23 to Eq. 25 mentioned above, which are set as gains with respect to the variable gain amplifiers 505, 506, 504, and 507, respectively (Step S1202). Finally, the phase $\phi j$ is determined through learning in a control circuit 413 and the coefficients $\alpha j$ and $\beta j$ are set with respect to the signal synthesizing circuit 412 (Step S1203). Thus, the tracking error signal TE is generated.

A specific example of the present embodiment is described as follows.

When respective beam intervals l between the main beam M and the sub-beams S1 and S2 are 120 $\mu$m and the intervals Tp between two adjacent tracks are 20.4 $\mu$m, an optimum angle $\theta0$ of a beam row with respect to a track 204 on a disk 107 is 2.44°. In this case, it is assumed that a revolution angle shift $\theta2$ is 1° and the amplitude levels of three beams are Lm=1, L1=0.5, and L2=0.5.

In the above-mentioned case, the phase $\phi1$ of the sub-beam S1 with respect to the main beam M is 2.22 rad, and the phase $\phi2$ of the sub-beam S2 with respect to the main beam M also is 2.22 rad. Therefore, the correction coefficients are determined from Eq. 23 to Eq. 25 as $$Fm1/F1 = Fm2/F2 = 0.0976 \text{ and}$$

$$F1/F2 = 1.0.$$

Figure 14:
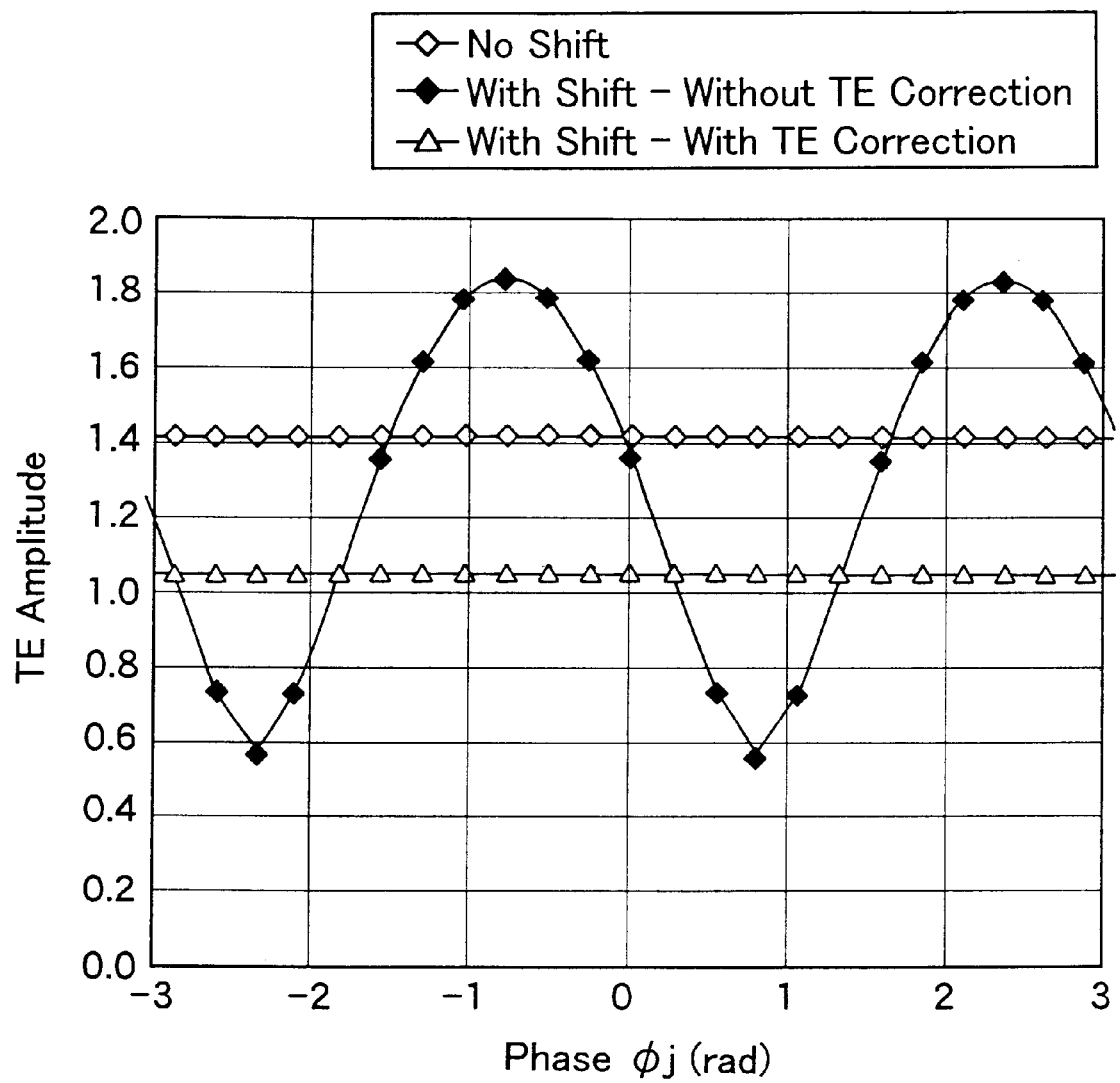
FIG. 14 is a graph showing variations in TE amplitude level when no shift occurs, when no shift occurs and no TE correction is made, and when shift occurs and the TE correction is made according to the third embodiment of the present invention.
Figure 15:
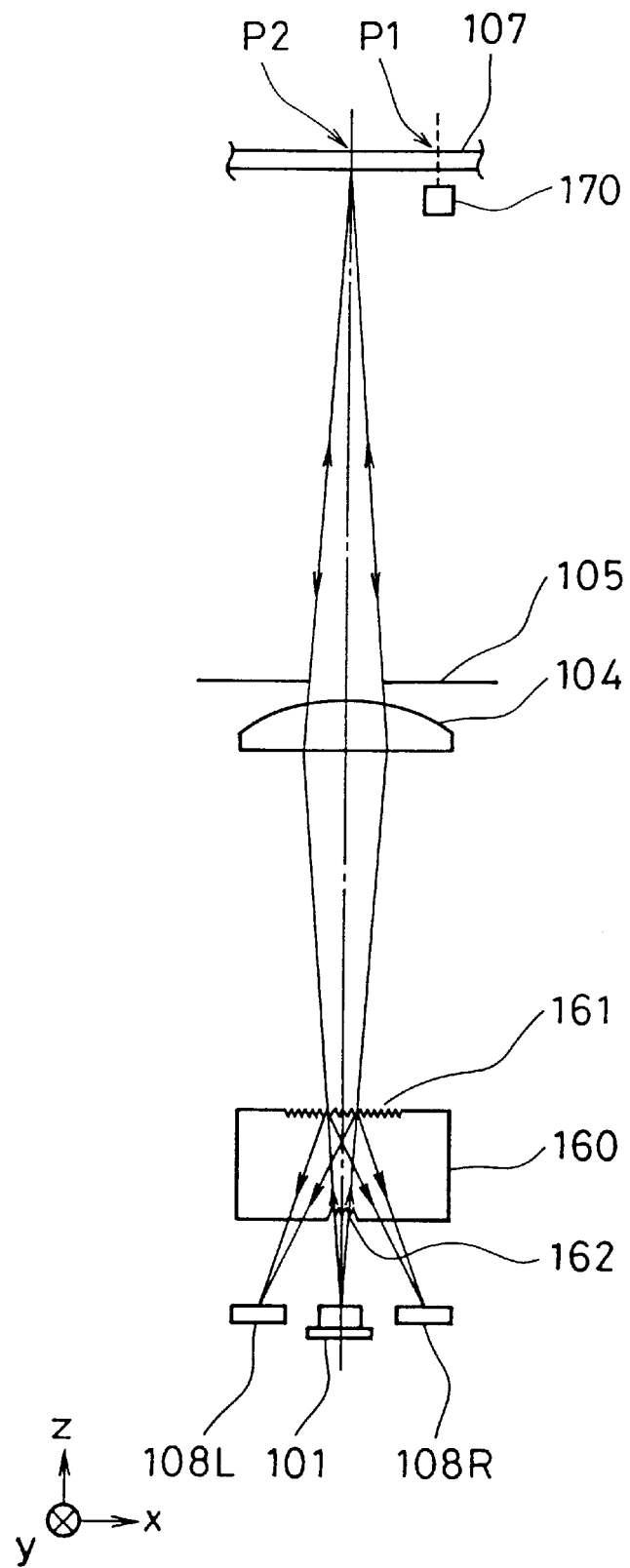
FIG. 15 is a schematic view of an optical system of a tracking signal generating device according to a conventional technique.
Figure 16:
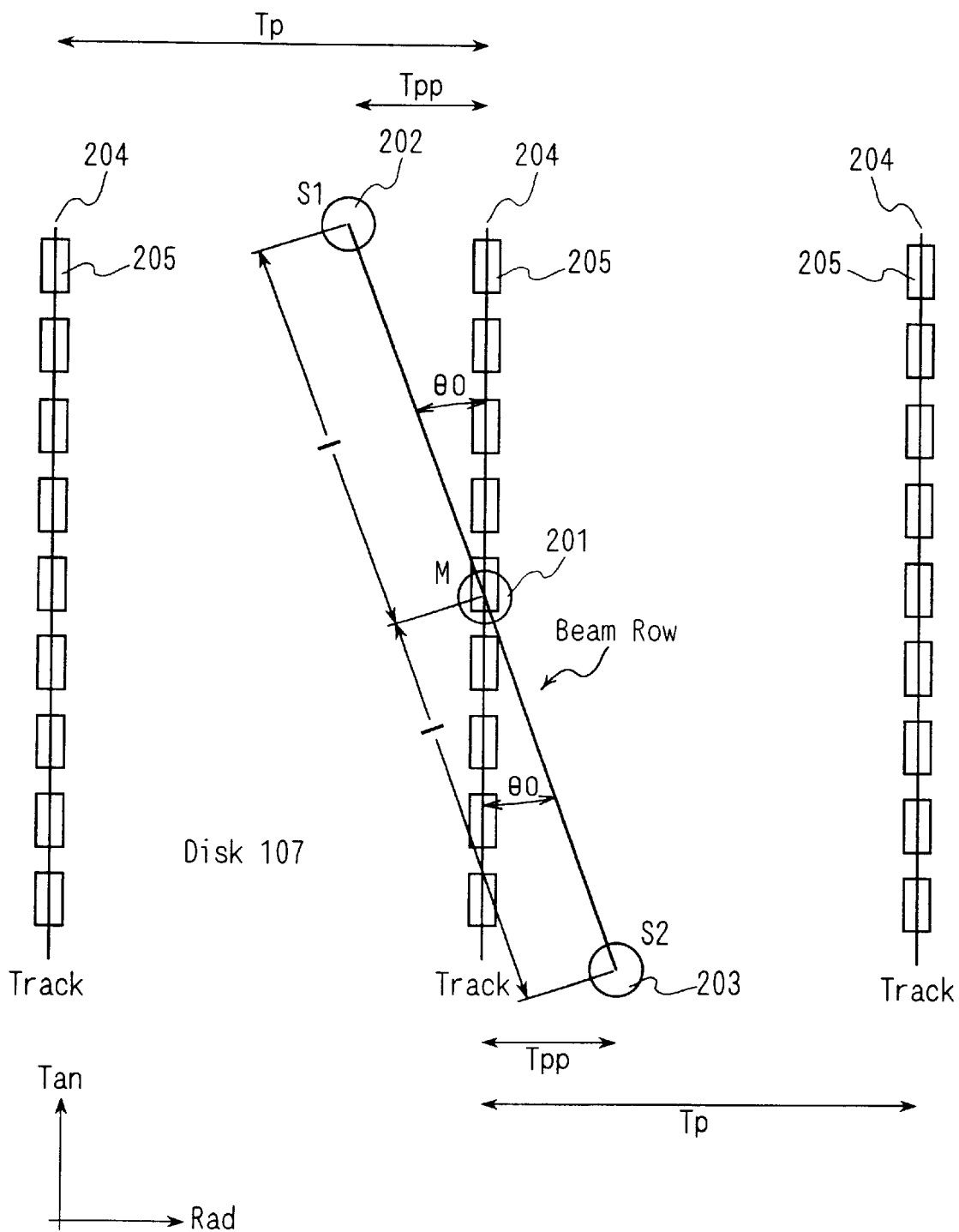
FIG. 16 is a schematic view showing the positional relationship between a track and main and sub-beams on a disk, which is assumed when no shift occurs in the conventional technique.

FIG. 14 shows results calculated as functions of the phase $\phi j$ for synthesizing a TE amplitude level in the case of no shift, that in the case where a shift occurs and correction is not made, and that in the case where a shift occurs and correction is made. As can be seen from FIG. 14, after the multiplication by the correction coefficients, the amplitude level of the tracking error signal TE becomes constant irrespective of the phase $\phi j$.

As described above, according to the present embodiment, even when the angle formed between a beam row of three beams and a track is shifted from an ideal angle $\theta0$ or the amplitude level varies, a tracking error signal with a constant amplitude can be obtained. Thus, it is not required to adjust the angle formed between a beam row of three beams and a track or the amplitude level, resulting in the reduction in manufacturing cost of a magnetic recording/reproducing system using this tracking signal generating device.

The respective first to third embodiments have independent effects and therefore can be combined.

Moreover, the procedures for determining the coefficients shown in FIGS. 3, 8, and 13 are executed every time information recording media are exchanged and directly after the starting of the device. Further, the procedures may be executed after the exchange of the information recording media and at every predetermined time period. In such a case, an influence due to the environmental change such as temperature increase in the device or the like can be reduced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A tracking signal generating device, comprising:

a light source for emitting light;

an optical system with which an information recording medium with a track from which information can be readout optically is irradiated with the light emitted from the light source as at least three optical beams;

photodetectors for receiving optical beams reflected from the information recording medium;

position signal generating sections for outputting three position signals Sm, Ss1, and Ss2 corresponding to each of the three optical beams and in accordance with a positional relationship between each of the optical beams and the track from signals obtained corresponding to a quantity of the optical beams entering the photodetectors;

intermediate signal generating sections for receiving the three position signals Sm, Ss1, and Ss2, calculating differences between Sm and Ss1 and between Sm and Ss2 with the position signal Sm being taken as a reference, executing calculation for correction, and generating two intermediate signals Sa and Sb; and a signal synthesizing circuit for synthesizing a zero-crossing tracking signal in an arbitrary phase with respect to the track from the intermediate signals Sa and Sb, wherein the intermediate signal generating sections execute the correction so that the intermediate signals Sa and Sb have same amplitude levels and are different in phase by $\pi/2$ rad in a track crossing direction, and output the intermediate signals Sa and Sb, wherein the signal synthesizing circuit multiplies the two intermediate signals Sa and Sb input thereinto by coefficients α and β given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and φ are constants, and adds the multiplied intermediate signals Sa and Sb.

2. A tracking signal generating device, comprising:

a light source for emitting light;

an optical system with which an information recording medium with a track from which information can be readout optically is irradiated with the light emitted from the light source as at least three optical beams;

photodetectors for receiving optical beams reflected from the information recording medium;

position signal generating sections for outputting three position signals Sm, Ss1, and Ss2 corresponding to each of the three optical beams and in accordance with a positional relationship between each of the optical beams and the track from signals obtained corresponding to a quantity of the optical beams entering the photodetectors;

a first variable gain amplifier with a coefficient Fm1 for receiving the position signal Sm and outputting a signal Fm1·Sm;

a second variable gain amplifier with a coefficient Fm2 for receiving the position signal Sm and outputting a signal Fm2·Sm;

a third variable gain amplifier with a coefficient F1 for receiving the position signal Ss1 and outputting a signal F1·Ss1;

a fourth variable gain amplifier with a coefficient F2 for receiving the position signal Ss2 and outputting a signal F2·Ss2;

a first differential operational circuit for receiving the signals Fm1·Sm and F1·Ss1 output from the first and third variable gain amplifiers and obtaining a difference signal Sa3 of the signals Fm1·Sm and F1·Ss1;

a second differential operational circuit for receiving the signals Fm2·Sm and F2·Ss2 output from the second and fourth variable gain amplifiers and obtaining a difference signal Sb3 of the signals Fm2·Sm and F2·Ss2; and a signal synthesizing circuit for multiplying the difference signals Sa3 and Sb3 from the first and second differential operational circuits by predetermined coefficients and adding the multiplied difference signals Sa3 and Sb3, which is output as a tracking signal, wherein the coefficients Fm1, Fm2, F1, and F2 are determined with respect to the first to fourth variable gain amplifiers so that the difference signals Sa3 and Sb3 have the same amplitude level and are different in phase by π/2 rad in a track crossing directions, wherein the signal synthesizing circuit multiplies the difference signals Sa3 and Sb3 input thereinto by coefficients α and β given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and φ are constants, and adds the multiplied difference signals Sa3 and Sb3.

3. A tracking signal generating device, comprising:

a light source for emitting light;

an optical system with which an information recording medium with a track from which information can be readout optically is irradiated with the light emitted from the light source as at least three optical beams;

photodetectors for receiving optical beams reflected from the information recording medium;

position signal generating sections for outputting three position signals Sm, Ss1, and Ss2 corresponding to each of the three optical beams and in accordance with a positional relationship between each of the optical beams and the track from signals obtained corresponding to a quantity of the optical beams entering the photodetectors;

a first differential operational circuit for receiving the position signals Sm and Ss1 and outputting a difference signal Sa thereof;

a second differential operational circuit for receiving the position signals Sm and Ss2 and outputting a difference signal Sb thereof; and a signal synthesizing circuit for multiplying the difference signals Sa and Sb output from the first and second differential operational circuits, respectively, by predetermined coefficients α and β and adding the multiplied difference signals Sa and Sb, which is output as a tracking signal, wherein the coefficients α and β are given by $$\alpha = (C \cdot \cos \phi)/La \text{ and}$$

$$\beta = (C \cdot \sin \phi)/Lb$$

or $$\alpha = (C \cdot \sin \phi)/La \text{ and}$$

$$\beta = (C \cdot \cos \phi)/Lb,$$

wherein La and Lb denote amplitudes of the difference signal Sa and Sb, respectively, and C and φ are constants.

4. A tracking signal generating method by irradiating an information recording medium with a track from which information can be readout optically with light emitted from a light source as at least three optical beams and receiving optical beams reflected from the information recording medium by photodetectors, the tracking signal generating method comprising:

generating three position signals Sm, Ss1, and Ss2 corresponding to each of the three optical beams and in accordance with a positional relationship between each of the optical beams and the track from signals obtained corresponding to a quantity of the optical beams entering the photodetectors;

receiving the three position signals Sm, Ss1, and Ss2, calculating differences between Sm and Ss1 and between Sm and Ss2 with the position signal Sm being taken as a reference, executing calculation for correction, and generating two intermediate signals Sa and Sb so that they are different in phase by π/2 rad in a track crossing direction and have same amplitude levels; and synthesizing a zero-crossing tracking signal in an arbitrary phase with respect to the track from the intermediate signals Sa and Sb, wherein the synthesizing of the zero-crossing tracking signal is executed by multiplying the two intermediate signals Sa and Sb by coefficients α and β given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and φ are constants, and adding the multiplied intermediate signals Sa and Sb.

5. A tracking signal generating method by irradiating an information recording medium with a track from which information can be readout optically with light emitted from a light source as at least three optical beams and receiving of optical beams reflected from the information recording medium by photodetectors, the tracking signal generating method comprising:

generating three position signals Sm, Ss1, and Ss2 corresponding to each of the three optical beams and in accordance with a positional relationship between each of the optical beams and the track from signals obtained corresponding to a quantity of the optical beams entering the photodetectors;

multiplying the position signal Sm by a coefficient Fm1 to generate a signal Fm1·Sm;

multiplying the position signal Sm by a coefficient Fm2 to generate a signal Fm2·Sm;

multiplying the position signal Ss1 by a coefficient F1 to generate a signal F1·Ss1;

multiplying the position signal Ss2 by a coefficient F2 to generate a signal F2·Ss2;

calculating a difference signal Sa3 of the signals Fm1·Sm and F1·Ss1;

calculating a difference signal Sb3 of the signals Fm2·Sm and F2·Ss2; and multiplying the difference signals Sa3 and Sb3 by predetermined coefficients and adding the multiplied difference signals Sa3 and Sb3, thus synthesizing a tracking signal;

wherein the coefficients Fm1, Fm2, F1, and F2 are determined so that the difference signals Sa3 and Sb3 have constant amplitude levels and are different in phase by π/2 rad in a track crossing direction, wherein the synthesizing of the tracking signal is executed by multiplying the difference signals Sa3 and Sb3 by coefficients α and β given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and φ are constants, and adding the multiplied difference signals Sa3 and Sb3.

6. A magnetic recording/reproducing system, comprising:

a magnetic head for recording or reproducing information with respect to an information recording medium with a track from which information can be readout optically;

a light source for emitting light;

an optical system with which the information recording medium is irradiated with the light emitted from the light source as at least three optical beams;

photodetectors for receiving optical beams reflected from the information recording medium;

position signal generating sections for outputting three position signals Sm, Ss1, and Ss2 corresponding to each of the three optical beams and in accordance with a positional relationship between each of the optical beams and the track from signals obtained corresponding to a quantity of the optical beams entering the photodetectors;

intermediate signal generating sections for receiving the three position signals Sm, Ss1, and Ss2, calculating differences between Sm and Ss1 and between Sm and Ss2 with the position signal Sm being taken as a reference, executing calculation for correction, and generating two intermediate signals Sa and Sb; and a signal synthesizing circuit for synthesizing a zero-crossing tracking signal in an arbitrary phase with respect to the track from the intermediate signals Sa and Sb, wherein the intermediate signal generating sections execute the correction so that the intermediate signals Sa and Sb have same amplitude levels and are different in phase by π/2 rad in a track crossing direction, and output the intermediate signals Sa and Sb, and tracking control is carried out according to the tracking signal output from the signal synthesizing circuit, wherein the signal synthesizing circuit multiplies the two intermediate signals Sa and Sb input thereinto by coefficients α and β given by $$\alpha = C \cdot \sin \phi \text{ and}$$

$$\beta = C \cdot \cos \phi$$

or $$\alpha = C \cdot \cos \phi \text{ and}$$

$$\beta = C \cdot \sin \phi,$$

where C and φ are constants, and adds the multiplied intermediate signals Sa and Sb.

7. A magnetic recording/reproducing system, comprising:

a magnetic head for recording or reproducing information with respect to an information recording medium with a track from which information can be readout optically;

a light source for emitting light;

an optical system with which the information recording medium is irradiated with the light emitted from the light source as at least three optical beams;

photodetectors for receiving optical beams reflected from the information recording medium;

position signal generating sections for outputting three position signals Sm, Ss1, and Ss2 corresponding to each of the three optical beams and in accordance with a positional relationship between each of the optical beams and the track from signals obtained corresponding to a quantity of the optical beams entering the photodetectors;

a first variable gain amplifier with a coefficient Fm1 for receiving the position signal Sm and outputting a signal Fm1·Sm;

a second variable gain amplifier with a coefficient Fm2 for receiving the position signal Sm and outputting a signal Fm2·Sm;

a third variable gain amplifier with a coefficient F1 for receiving the position signal Ss1 and outputting a signal F1·Ss1;

a fourth variable gain amplifier with a coefficient F2 for receiving the position signal Ss2 and outputting a signal F2·Ss2;

a first differential operational circuit for receiving the signals Fm1·Sm and F1·Ss1 output from the first and third variable gain amplifiers and obtaining a difference signal Sa3 of the signals Fm1·Sm and F1·Ss1;

a second differential operational circuit for receiving the signals Fm2·Sm and F2·Ss2 output from the second and fourth variable gain amplifiers and obtaining a difference signal Sb3 of the signals Fm2·Sm and F2·Ss2; and a signal synthesizing circuit for multiplying the difference signals Sa3 and Sb3 from the first and second differential operational circuits by predetermined coefficients and adding the multiplied difference signals Sa3 and Sb3, which is output as a tracking signal, wherein the coefficients Fm1, Fm2, F1, and F2 are determined with respect to the first to fourth variable gain amplifiers so that the difference signals Sa3 and Sb3 have the same amplitude level and are different in phase by $\pi/2$ rad in a track crossing direction, and tracking control is carried out according to the tracking signal output from the signal synthesizing circuit, wherein the signal synthesizing circuit multiplies the difference signals Sa3 and Sb3 input thereinto by coefficients $\alpha$ and $\beta$ given by $\alpha = C \cdot \sin \phi$ and $\beta = C \cdot \cos \phi$ or $\alpha = C \cdot \cos \phi$ and $\beta = C \cdot \sin \phi$, where C and $\phi$ are constants, and adds the multiplied difference signals Sa3 and Sb3.

8. A magnetic recording/reproducing system, comprising:

a magnetic head for recording or reproducing information with respect to an information recording medium with a track from which information can be readout optically;

a light source for emitting light;

an optical system with which the information recording medium is irradiated with the light emitted from the light source as at least three optical beams;

photodetectors for receiving optical beams reflected from the information recording medium;

position signal generating sections for outputting three position signals Sm, Ss1, and Ss2 corresponding to each of the three optical beams and in accordance with a positional relationship between each of the optical beams and the track from signals obtained corresponding to a quantity of the optical beams entering the photodetectors;

a first differential operational circuit for receiving the position signals Sm and Ss1 and outputting a difference signal Sa thereof;

a second differential operational circuit for receiving the position signals Sm and Ss2 and outputting a difference signal Sb thereof; and a signal synthesizing circuit for multiplying the difference signals Sa and Sb output from the first and second differential operational circuits, respectively, by predetermined coefficients $\alpha$ and $\beta$ and adding the multiplied difference signals Sa and Sb, which is output as a tracking signal, wherein the coefficients $\alpha$ and $\beta$ are given by $\alpha = (C \cdot \cos \phi)/La$ and $\beta = (C \cdot \sin \phi)/Lb$ or $\alpha = (C \cdot \sin \phi)/La$ and $\beta = (C \cdot \cos \phi)/Lb$, wherein La and Lb denote amplitudes of the difference signals Sa and Sb, respectively, and C and $\phi$ are constants, and tracking control is carried out according to the tracking signal output from the signal synthesizing circuit.

* * * * *

UNITED STATES PATENT AND TRADEMARK OFFICE
CERTIFICATE OF CORRECTION

PATENT NO. : 6,741,416 B2
DATED : May 25, 2004
INVENTOR(S) : Sano et al.

It is certified that error appears in the above-identified patent and that said Letters Patent is hereby corrected as shown below:

Column 24,
Line 44, "$\beta=(C \cos \Phi/Lb$," should read -- $\beta=(C \cos \Phi)/Lb$, --

Signed and Sealed this

Ninth Day of November, 2004

JON W. DUDAS
*Director of the United States Patent and Trademark Office*